United States Patent
Riskas et al.

(12) 
(10) Patent No.: US 12,494,735 B2
(45) Date of Patent: Dec. 9, 2025

(54) HINGE-LOCKING MECHANISM FOR DEPLOYABLE SOLAR ARRAY

(71) Applicant: Xplore Inc., Mercer Island, WA (US)

(72) Inventors: Brian Riskas, Fort Worth, TX (US); Brandon Van, Redmond, WA (US)

(73) Assignee: Xplore Inc., Mercer Island, WA (US)

( * ) Notice: Subject to any disclaimer, the term of this patent is extended or adjusted under 35 U.S.C. 154(b) by 0 days.

(21) Appl. No.: 18/908,268

(22) Filed: Oct. 7, 2024

(65) Prior Publication Data
US 2025/0119093 A1    Apr. 10, 2025

Related U.S. Application Data

(60) Provisional application No. 63/589,135, filed on Oct. 10, 2023.

(51) Int. Cl.
*H02S 20/30*    (2014.01)
*B64G 1/22*    (2006.01)
*B64G 1/44*    (2006.01)

(52) U.S. Cl.
CPC ............ *H02S 20/30* (2014.12); *B64G 1/2222* (2023.08); *B64G 1/2228* (2023.08); *B64G 1/443* (2013.01)

(58) Field of Classification Search
CPC .. B64G 1/2222; B64G 1/2228; B64G 1/2229; B64G 1/443
See application file for complete search history.

(56) References Cited

U.S. PATENT DOCUMENTS

| | | | |
|---|---|---|---|
| 4,578,919 A | 4/1986 | Amadon et al. | |
| 4,667,899 A * | 5/1987 | Wedertz | F42B 10/14 244/3.28 |
| 4,880,188 A * | 11/1989 | Roth | B64G 1/2222 244/172.6 |
| 4,918,786 A | 4/1990 | Perry | |
| 5,356,095 A * | 10/1994 | Aker | B64G 1/2221 244/172.6 |
| 5,600,868 A * | 2/1997 | Tourville | E05F 1/1223 16/280 |
| 5,715,573 A * | 2/1998 | Holemans | B64G 1/2229 244/172.6 |
| 5,911,536 A * | 6/1999 | Roth | F24S 30/40 244/172.6 |

(Continued)

FOREIGN PATENT DOCUMENTS

| | | |
|---|---|---|
| JP | S58188800 A | 11/1983 |
| JP | H04314698 A | 11/1992 |

*Primary Examiner* — Joshua J Michener
*Assistant Examiner* — Cindi M Curry
(74) *Attorney, Agent, or Firm* — NEO IP

(57) ABSTRACT

Artificial satellites are dependent on solar arrays to produce the power needed to support the functional components of the satellite. The present invention is directed to a hinge-locking mechanism designed to maximize the photovoltaic real estate of a solar array of an artificial satellite. The hinge-locking mechanism facilitates the deployment of the solar array upon the artificial satellite entering orbit. The hinge-locking mechanism utilizes a tapered pin with an internal spring resting against an asymmetrically oval shaped cam of a common pivot point. The hinge-lock trades kinetic energy of a solar panel for spring compression to permanently lock the solar array in place upon deployment while reducing the shock load and maximizing deployed stiffness.

17 Claims, 17 Drawing Sheets

(56) References Cited

U.S. PATENT DOCUMENTS

| | | |
|---|---|---|
| 6,419,146 B1 | 7/2002 | Buldhaupt et al. |
| 6,450,725 B1 * | 9/2002 | Roth ................... B64G 1/6457 403/28 |
| 7,229,046 B2 | 6/2007 | DuRant |
| 8,757,554 B1 * | 6/2014 | Harvey ................ B64G 1/2228 244/172.7 |
| 9,120,583 B1 | 9/2015 | Spence et al. |
| 9,139,286 B2 | 9/2015 | Parker |
| 9,450,131 B1 | 9/2016 | Spence et al. |
| 9,742,348 B2 | 8/2017 | Francis et al. |
| 9,758,260 B2 | 9/2017 | Halsband |
| 10,370,126 B1 | 8/2019 | Harvey |
| 10,494,083 B2 | 12/2019 | Currie et al. |
| 11,885,372 B2 | 1/2024 | Riot et al. |
| 11,912,440 B2 | 2/2024 | Baghdasarian |
| 12,040,740 B2 | 7/2024 | Freestone et al. |
| 2018/0037341 A1 * | 2/2018 | Kalman ................ B64G 1/443 |
| 2018/0167586 A1 | 6/2018 | Rutschman et al. |
| 2018/0239948 A1 | 8/2018 | Rutschman et al. |
| 2023/0046563 A1 | 2/2023 | Baghdasarian |

\* cited by examiner

HINGE-LOCKING MECHANISM FOR DEPLOYABLE SOLAR ARRAY

CROSS-REFERENCE TO RELATED APPLICATIONS

This application is related to and claims priority from the following US patents and patent applications: this application claims priority from and the benefit of U.S. Provisional Patent Application No. 63/589,135, filed Oct. 10, 2023, which is incorporated herein by reference in its entirety.

BACKGROUND OF THE INVENTION

1. Field of the Invention

The present invention relates to a deployable panel system for spacecraft, and more specifically to a hinge-locking mechanism that enables deployable solar panels with maximized panel size and stiffness.

2. Description of the Prior Art

It is generally known in the prior art to provide an artificial satellite with deployable solar panels.

U.S. Pat. No. 9,758,260 for Low volume micro satellite with flexible winded panels expandable after launch by inventor Halsband, filed Aug. 8, 2013 and issued Sep. 12, 2017, is directed to micro satellite with foldable solar panels that may be winded around the body of the micro satellite so that the growth in outer dimensions of the satellite is no more than 10-20 mm along each one of the length, width and height of the microsatellite so that the micro satellite may be launched in an auxiliary payload volume of a launcher. The foldable solar panels may be deployed to employ area that exceeds 9 times the product of the length by the width of the satellite and 6 times the product of the height by the length. The solar power produced by the solar panel and their light weight enable carrying of cargo that is at least 0.6 of the of the total mass of the satellites.

U.S. Pat. No. 9,450,131 for Rollable and accordian foldable refractive concentrator space solar array panel by inventors Spence et al., filed Nov. 24, 2013 and issued Sep. 20, 2016, is directed to a rollable and accordion foldable refractive lens concentrator flexible solar array blanket structure assembly for a spacecraft/satellite application consisting of at least one or more rows of electrically interconnected solar cells and at least one or more rows of deployable elongated refractive lenses elevated and aligned from the top surface of the solar cells. The entire blanket assembly, inclusive of lenses and solar cell substrates, kinematically deploys by unrolling or unfolding the assembly for its stowed package configuration, and the final tensioning of the blanket assembly produces an aligned assembly where the solar cell substrate subassembly and the lens subassembly are coplanar. Deployment of the integrated blanket assembly (with refractive lenses) is directly coupled through the unrolling or the accordion unfolding deployment kinematics of the concentrator blanket assembly.

U.S. Pat. No. 11,912,440 for Partially flexible solar array structure by inventor Baghdasarian, filed Sep. 1, 2021 and issued Feb. 27, 2024, is directed to a solar array structure, such as for a spacecraft, uses thin solar array panels that, when in a stowed configuration, are stiffened by being bent or curved in one direction to be shaped like a section of a cylinder and placed within a rigid structural frame. As a curved solar panel is not as efficient as a flat panel directly facing the sun, the solar array panels are curved in their stowed configuration for launch only, but flatten after deployment by use of a partially flexible structural frame, where a rectangular frame is made of two opposing rigid sides and two opposing flexible sides, with a thin flexible solar panel attached to rigid sides only. The rigid sides are compressed during stowage to curve the panel before hold-down tensioning. The structure and panels return to their flat free state configuration after release.

U.S. Pat. No. 12,040,740 for Retractable Z-fold flexible blanket solar array by inventors Freestone et al., filed Oct. 19, 2021 and issued Jul. 16, 2024, is directed to a solar array structure for a spacecraft including one or a pair of flexible blanket or other foldable solar arrays and a deployable frame structure. The deployable frame structure includes a T-shaped yoke structure, a T-shaped end structure, and one or more rigid beams, the T-shaped yoke structure connectable to the spacecraft. When deployed, the frame structure tensions the flexible blanket solar array or arrays between the T-shaped yoke structure and the T-shaped end structure. When stowed, the flexible blanket solar array or arrays are folded in an accordion manner to form a stowed pack or packs between the cross-member arms of the T-shaped yoke structure and the T-shaped end structure, also stowed in its own Z-fold arrangement. The cross-member arms of the T-shaped end structure can include a solar array that can provide power before deployment while the flexible blanket solar array is stowed.

U.S. Pat. No. 11,885,372 for Friction-less low-profile hinge system and method by inventors Riot et al., filed Jul. 13, 2020 and issued Jan. 30, 2024, is directed to a reduced friction torsion component system that makes use of a first frame portion adapted to be coupled to, or integrally formed with, a first object, and forming a first bore, and a second frame portion adapted to be coupled to, or integrally formed with, a second object, and forming a second bore. The two bores are axially aligned and receive at least one elongated hinge component. The elongated hinge component operates to both couple the first and second frame portions together for pivoting movement relative to one another, and also provides a torsional biasing force to enable pivotal deployment from a first position to a second position of one of the first or second frame portions.

U.S. Pat. No. 9,742,348 for Foldable array of three-dimensional panels including functional electrical components by inventors Francis et al., filed Sep. 11, 2014 and issued Aug. 22, 2017, is directed to a foldable array of three-dimensional panels, which may include one or more functional electrical components. For instance, the three-dimensional multi-panel array may be reconfigured from a substantially planar configuration into a three-dimensional configuration.

U.S. Pat. No. 10,370,126 for Solar panel array assembly by inventors Harvey et al., filed Jun. 23, 2014 and issued Aug. 6, 2019, is directed to a solar panel array assembly adapted to transition between a stowed condition in which at least two solar panels are stacked and a deployed condition in which the solar panels are unstacked relative to the stowed condition and that exhibits a low-profile when in the stowed condition. In one embodiment, the assembly includes at least two solar panels, a flexible hinge connecting and extending between the panels that allows relative rotation of the panels to one another, a torsion bar for providing the force for causing the rotation of the panels for the transition between the stowed and deployed conditions, and a truss structure that transitions from a relatively flat, inoperative state when the panels are stowed to an operative state for use with deployed panels.

U.S. Pat. No. 4,578,919 for Self-stowing arrangement for structural tension members with taper latch hinge coupling joints by inventors Amadon et al., filed Jul. 14, 1982 and issued Apr. 1, 1986, is directed to a compact, deployable support structure arrangement includes a collapsible truss structure having tension cable members formed of specifically configured tension tapes. These tension tapes diagonally cross one another as they extend between respective pairs of longeron support truss members. The tension tapes are preformed to have two straight sections joined together by a plurality of loops. Because of the nature of the topological surface defined by such shapes, the tapes, when relaxed, will automatically refold into a stable, non-tangled condition. The hinge joints that pivotally interconnect successive longeron subsections employ a novel, effectively zero-backlash, taper latch hinge mechanism. As the portions of the hinge are rotated about a pivot axis, a locking pin is caused to contact an outer cam surface of a hinge contact plate face so as to be driven against the bias action of a spring, and to travel along the outer cam surface. Eventually, the longeron subsections rotate to a point where the longerons are in substantially end-to-end abutment causing the locking pin to be captured by the inner surface of a hook plate so that the locking pin thereby creates a wedge effect that locks the now abutting longerons subsections together.

U.S. Pat. No. 9,120,583 for Space solar array architecture for ultra-high power applications by inventors Spence, et al., filed Apr. 14, 2012 and issued Sep. 1, 2015 is directed to a large area, deployable flexible blanket photovoltaic solar array architecture for high power applications is disclosed. The structure is a modularized and scalable solar array system that provides high power level scalability. The structure is comprised of repeating, similar modular deployable roll-out solar array wings mounted in an opposing manner and along the length of a rigid, strong and efficiently packaged deployable backbone structure. The deployable roll-out solar array building block modular "winglet" elements can be comprised of either a rolled or z-folded flexible photovoltaic blanket configuration, and their structural deployment is motivated by the elastic strain energy of longitudinal roll-out booms. The backbone structure is comprised of a stiff deployable beam structure articulated that is deployed perpendicular with respect to the spacecraft sidewall and latched out. Deployment of the "winglets" can be conducted once the articulated backbone structure has been deployed, is latched, and forms a rigid beam.

U.S. Pat. No. 6,419,146 for Metal sandwich structure with integral hardpoint by inventors Buldhaupt, et al., filed Jul. 5, 2000 and issued Jul. 16, 2002, is directed to a superplastically formed, diffusion bonded sandwich structure having integral metal hardpoints, made by joining two superplastic metal core sheets together into a core pack by welding or diffusion bonding along a pattern of lines which form junction lines between the core sheets when the pack is inflated by gas pressure at superplastic temperatures. Face sheets are laid under and over the core pack and metal inserts are interposed between the face sheets and the core. All of the sheets in the pack are sealed together around an outside peripheral edge to create a gas tight envelope. The pack is heated to superplastic temperatures in a cavity in a die, and the top and bottom face sheets are diffusion bonded to top and bottom surfaces of the metal insert by application of heat and pressure from top and bottom inner surfaces of the die cavity. While at superplastic temperatures, the pack is inflated by gas pressure against inside surfaces of a die to form an expanded metal sandwich structure having integral webs and integral hardpoints formed by the metal insert. After forming, the gas pressure is reduced to near atmospheric, the die is opened and the part is removed from the die.

U.S. Pat. No. 7,229,046 for Servo mounting system for direct drive of an aircraft control surface by inventor DuRant, filed Oct. 25, 2005 and issued Jun. 12, 2007, is directed to a servo mounting system, which allows a servo with a rotating output shaft to directly power an aircraft control surface. A specially designed servo mount securely positions the servo with the central axis of its rotational output shaft on, and axially aligned with, the hinge line of the control surface it drives. The servo shaft and servo body are directly connected to the airframe and control surface, thereby conserving rotational motion while driving control movement. Electronic means are then used to control the neutral point and the limit of travel of the servo. The system eliminates lost motion without generating adverse linear loads within the drive assembly.

US Patent Publication No. 2018/0239948 for Satellite with machine vision for disaster relief support by inventors Rutschman, Brav, Hannigan, et al., filed Feb. 22, 2018 and published Aug. 23, 2018, is directed to a satellite configured to provide machine vision for disaster-relief support includes, but is not limited to, at least one imager; one or more computer readable media bearing one or more program instructions; and at least one computer processor configured by the one or more program instructions to perform operations including at least: obtaining imagery using the at least one imager of the satellite; detecting at least one event by analyzing at least one aspect of the imagery; and executing at least one operation based on the at least one event.

US Patent Publication No. 2018/0167586 for Satellite imaging system with edge processing by inventors Rutschman, Brav, Hannigan, et al., filed Dec. 15, 2017 and published Jun. 14, 2018, is directed to a satellite imaging system with edge processing includes, but is not limited to, at least one first imaging unit configured to capture and process imagery of a first field of view; at least one second imaging unit configured to capture and process imagery of a second field of view that is proximate to and larger than a size of the first field of view; and a hub processing unit linked to the at least one first imaging unit and the at least one second imaging unit.

U.S. Pat. No. 9,139,286 for Hinge assembly for rotatably mounting a control surface on an aircraft by inventor Parker, filed May 31, 2013 and issued Sep. 22, 2015, is directed to A hinge assembly for rotatably mounting a control surface on an aircraft comprising an actuating shaft, a support element configured to mount the actuating shaft to a first component of an aircraft and a hinge element configured to mount the actuating shaft to a second component of an aircraft, wherein the actuating shaft is slidably mounted to the support element and configured to slide along its longitudinal axis relative to the support element, and the hinge element engages with the actuating shaft so that the actuating shaft and the hinge element are urged to rotate relative to each other about the longitudinal axis of the actuating shaft when the actuating shaft is urged to slide along its longitudinal axis, such that one of said first and second components is urged to rotate relative to the other said component about the longitudinal axis.

U.S. Pat. No. 4,918,786 for Hinge with leaves which reinforce one another against bending deflection by inventor Perry, filed Nov. 8, 1988 and issued Apr. 24, 1990, is directed to a hinge having at least three leaves pivotally joined along edges of the leaves and adapted for attachment to two members to be pivotally connected with at least one member secured to a pair of the leaves which are mutually inclined in such a way that each leaf of the pair resists bending of the other leaf of the pair. A present best mode embodiment of the hinge has four leaves and is designed primarily for use on so-called ultralight airplanes as aileron, rudder, and elevator hinges which are immune to fatigue stress failure. Another hinge embodiment is designed for use as a door hinge and has only three leaves.

U.S. Pat. No. 10,494,083 for Aircraft flap hinge by inventors Currie, et al., filed Nov. 21, 2016 and issued Dec. 3, 2019, is directed to aerodynamic drag associated with a flap hinge assembly used to pivotally mount a flap to the trailing edge of an aircraft wing can be reduced when the cross-sectional area of the hinge fairing which surrounds the flap hinge assembly is reduced in size. The reduction in cross-sectional area of the hinge fairing is enabled when the flap hinge assembly attachment footprint to the underside of the flap box is also reduced. The flap hinge assembly has an internal support rib positioned between spars of the flap box structure internal to the skin, a hinge fitting exhibiting an actuation point and a hinge point positioned proximate a front spar of the flap box structure external to the skin, and a link passing through an aperture in the lower skin of the flap and coupling the internal support rib to the hinge fitting.

SUMMARY OF THE INVENTION

The present invention relates to a hinge-locking mechanism to enable deployment of a solar panel array that maximizes the space for photovoltaic cells on an artificial satellite to enable high-power generation for the artificial satellite.

It is an object of this invention to maximize the area for and number of photovoltaic cells on a deployable solar panel array of an artificial satellite by including hinge-lock mechanism for deployment of the solar array that does not sacrifice structural integrity. It is another object of this invention to provide a single device to facilitate the functions of a spring, damper, and lock for deployment of panels on an artificial satellite without the need for a motor.

In one embodiment, the present invention includes a solar panel system including at least one solar panel; at least one hinge-lock; and a passive release beam; wherein the at least one hinge-lock includes at least one female ear component connected to a central pivot point and at least one tapered pin; wherein the central pivot point includes at least one bore operable to receive the at least one tapered pin; wherein the at least one female ear component is connected to the at least one solar panel; wherein the passive release beam is connected to the at least one solar panel; wherein the passive release beam is operable to deploy the at least one solar panel; and wherein the at least one tapered pin is operable to penetrate the at least one bore of the central pivot point upon the deployment of the at least one solar panel.

In another embodiment, the present invention includes a satellite solar panel system including at least one solar panel; at least one hinge-lock; a passive release beam; and at least one hold-down bracket connected to the at least one solar panel; wherein the at least one hinge-lock includes at least one female ear component connected to a central pivot point and at least one tapered pin; wherein the central pivot point includes at least one bore operable to receive the at least one tapered pin; wherein the at least one female ear component is connected to the first solar panel; wherein the passive release beam is connected to the at least one solar panel; wherein the at least one hold-down bracket restricts movement of the passive release beam until the at least one hold-down bracket is released; wherein the passive release beam is operable to deploy the at least one solar panel upon release of the at least one hold-down bracket; and wherein the at least one tapered pin is operable to penetrate the at least one bore of the central pivot point upon the deployment of the at least one solar panel.

In yet another embodiment, the present invention includes a satellite solar panel system including at least one solar panel; at least one hinge-lock; a passive release beam; and at least one hold-down bracket; wherein the at least one hinge-lock includes at least one female ear component connected to a central pivot point and at least one tapered pin; wherein the central pivot point includes at least one bore operable to receive the at least one tapered pin; wherein the at least one female ear component is connected to the at least one solar panel; wherein the passive release beam is connected to the at least one solar panel; wherein the at least one hold-down bracket restricts movement of the passive release beam until the at least one hold-down bracket is released; wherein the passive release beam is operable to deploy the at least one solar panel upon release of the at least one hold-down bracket without a motor; and wherein the at least one tapered pin is operable to penetrate the at least one bore of the central pivot point upon the deployment of the at least one solar panel.

These and other aspects of the present invention will become apparent to those skilled in the art after a reading of the following description of the preferred embodiment when considered with the drawings, as they support the claimed invention.

DETAILED DESCRIPTION

Figure 1:
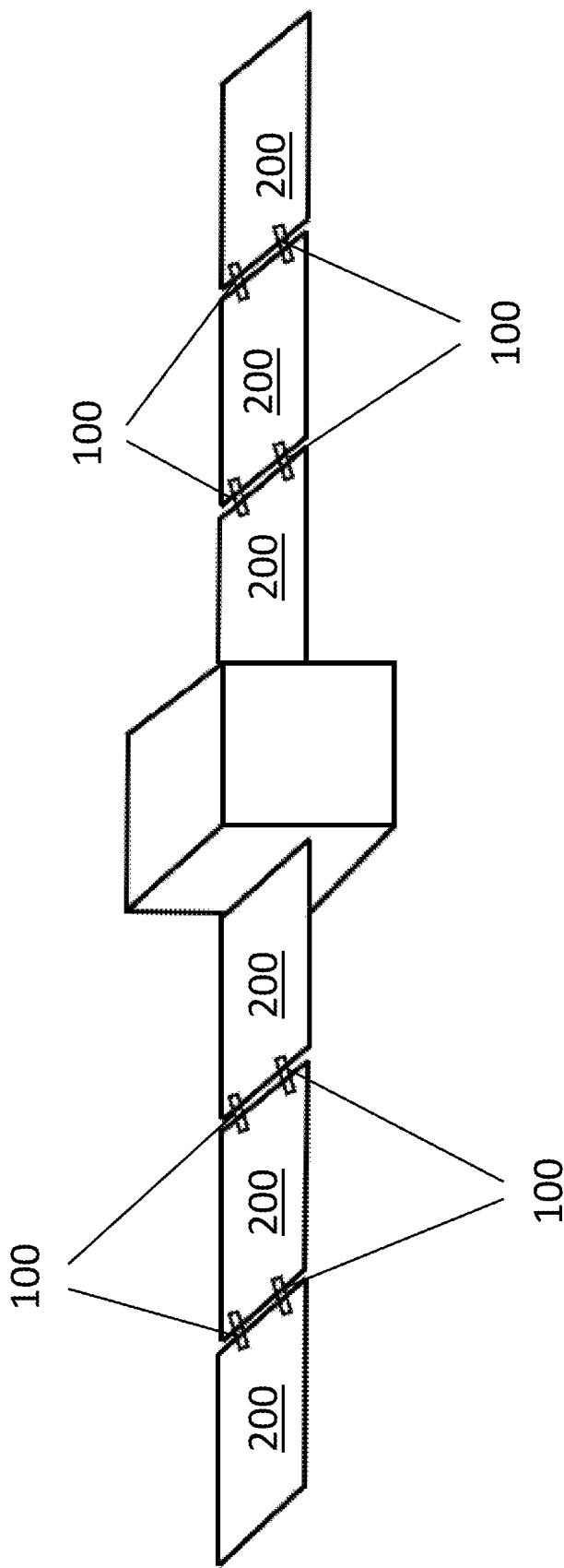
FIG. 1 illustrates a perspective view of an artificial satellite with a deployed solar panel array according to one embodiment of the present invention.

The present invention is generally directed to a hinge-locking mechanism for deployment of a solar array for an artificial satellite.

In one embodiment, the present invention includes a solar panel system including at least one solar panel; at least one hinge-lock; and a passive release beam; wherein the at least one hinge-lock includes at least one female ear component connected to a central pivot point and at least one tapered pin; wherein the central pivot point includes at least one bore operable to receive the at least one tapered pin; wherein the at least one female ear component is connected to the at least one solar panel; wherein the passive release beam is connected to the at least one solar panel; wherein the passive release beam is operable to deploy the at least one solar panel; and wherein the at least one tapered pin is operable to penetrate the at least one bore of the central pivot point upon the deployment of the at least one solar panel.

In another embodiment, the present invention includes a satellite solar panel system including at least one solar panel; at least one hinge-lock; a passive release beam; and at least one hold-down bracket connected to the at least one solar panel; wherein the at least one hinge-lock includes at least one female ear component connected to a central pivot point and at least one tapered pin; wherein the central pivot point includes at least one bore operable to receive the at least one tapered pin; wherein the at least one female ear component is connected to the first solar panel; wherein the passive release beam is connected to the at least one solar panel; wherein the at least one hold-down bracket restricts movement of the passive release beam until the at least one hold-down bracket is released; wherein the passive release beam is operable to deploy the at least one solar panel upon release of the at least one hold-down bracket; and wherein the at least one tapered pin is operable to penetrate the at least one bore of the central pivot point upon the deployment of the at least one solar panel.

In yet another embodiment, the present invention includes a satellite solar panel system including at least one solar panel; at least one hinge-lock; a passive release beam; and at least one hold-down bracket; wherein the at least one hinge-lock includes at least one female ear component connected to a central pivot point and at least one tapered pin; wherein the central pivot point includes at least one bore operable to receive the at least one tapered pin; wherein the at least one female ear component is connected to the at least one solar panel; wherein the passive release beam is connected to the at least one solar panel; wherein the at least one hold-down bracket restricts movement of the passive release beam until the at least one hold-down bracket is released; wherein the passive release beam is operable to deploy the at least one solar panel upon release of the at least one hold-down bracket without a motor; and wherein the at least one tapered pin is operable to penetrate the at least one bore of the central pivot point upon the deployment of the at least one solar panel.

None of the prior art discloses a hinge-locking mechanism operable to maximize the amount of space available for photovoltaic cells on a solar array of an artificial satellite nor a single mechanism to facilitate the functions of a spring, damper, and locking mechanism for solar array deployment of an artificial satellite as disclosed in the present application.

Artificial satellites and spacecraft often utilize deployable components such as solar panels, radiators, antennas, and other appendages. The deployable components must be stowed during launch to avoid damaging the deployable components, and are released once the spacecraft is in orbit. Most artificial satellites and spacecraft require solar panels to power sensors, propulsion components, and other power-consuming devices. The number and type of power-consuming components of an artificial satellite and spacecraft are limited by several factors, including weight, cost, and power available for these sensors and other components. Recent improvements in imaging technology have provided for data capture which previously has not been possible. In order to utilize improved imaging technology in space, more power is required than is available to be provided by prior art satellites and prior art deployable solar arrays. There is a need for a satellite operable to provide enough power to support high-power sensors and other components which is also cost effective to launch. Consequently, there is a need to produce more power from solar arrays on satellites which are of comparable size and weight to existing solar arrays and satellites due to the increased expense associated with launching larger and/or heavier spacecraft.

Two performance metrics are used to measure the performance of solar arrays for spacecraft. The first performance metric is the specific power of the solar array, which is determined by the watts generated divided by mass of the solar array. The second performance metric is the packaging efficiency of the solar array, which is determined by the watts produced divided by stowed volume of the solar array. The present invention improves both of these metrics through implementation of a hinge-locking mechanism for solar panels on an artificial satellite. The hinge-locking mechanism facilitates the stowing and deployment of the panels of the artificial satellite. Most deployable solar arrays utilize sandwiched or stacked panels with face sheets of composite or metal material bonded to a honeycomb core. While these panels are used for their low mass and high stiffness, they also require hinges to be placed far away from the edge of the panel, resulting in less area for photovoltaic cells. In contrast to the prior art, the hinge-lock of the present invention maximizes the area available for photovoltaic cells of the deployable panels, maximizes the stiffness of the deployable panels, and reduces or dissipates the kinetic energy of the panel as its deployed. The present invention accomplishes this through a number of different mechanism including: attachment to the edge of a hardpoint of the solar panel to extend several characteristic dimensions into the panel without disturbing the face of the panel resulting in a smaller contact area to maximize the amount of photovoltaic cells on each panel; inclusion of the angle of the conical surface of common pivot point to increase the stiffness of the panel system; and trading kinetic energy from panel deployment into potential spring energy. The hinge-lock of the present invention further provides a single, compact mechanism for both facilitating deployment of a solar array and locking the solar array in a deployed position.

Referring now to the drawings in general, the illustrations are for the purpose of describing one or more preferred embodiments of the invention and are not intended to limit the invention thereto.

FIG. 1 illustrates an artificial satellite with a deployed solar panel array according to one embodiment of the present invention. The hinge-locks 100 are positioned between and join together solar panels 200 of the solar panel array of FIG. 1. In one embodiment, the hinge-locks 100 are operable to connect two solar panels 200 of a solar panel array together, such that they are connected both in a folded position and in a deployed position. While FIG. 1 illustrates an artificial satellite utilizing two hinge-locks 100 to connect adjacent solar panels 200, and shows three solar panels 200 per array, totaling four hinge-locks 100 per solar array (i.e., eight for the entire artificial satellite), one of ordinary skill in the art will appreciate that less or more hinge-locks 100 are operable to connect solar panels 200 of a solar panel array and that solar panel arrays are able to have varying numbers of panels. As a nonlimiting examples, the artificial satellite utilizes a single hinge-lock 100 to connect each solar panel 200 of the solar array. In another nonlimiting example, two hinge locks 100 are used to connect each adjacent pair of solar panels 200 in the array (e.g., one hinge lock 100 at each end of the pair of panels 200). In yet another nonlimiting example, the artificial satellite utilizes three hinge-locks 100 to connect each adjacent pair of solar panels of the solar panel array. One of ordinary skill in the art will understand that the number of hinge locks 100 able to be used is not intended to be limiting and the number is only limited by the size of the panels relative to the size of the individual hinge locks 100. In the preferred embodiment, the two hinge-locks 100 are utilizes to connect each panel 200 of the solar array and are placed approximately near the ends of the panel 200.

In one embodiment, the hinge-lock mechanism 100 of the present invention is operable to enable an artificial satellite to have increased power production to power a large quantity of sensors and/or high-power sensors. In one embodiment, the hinge-lock mechanism 100 is operable to be any size. In a preferred embodiment, the hinge-lock mechanism 100 varies in size depending in part on a solar panel substrate layer thickness. Advantageously, the configuration of the hinge-lock mechanism 100 is operable to increase the space available for photovoltaic cell on the solar array. The present invention is operable to increase the power producing capabilities of an artificial satellite by minimizing the space required to connected solar panels, which increase the number or size of photovoltaic cells used in the solar array. Importantly, an artificial satellite, due to their presence in space, rely on their solar panels to power the mechanisms of the craft. By increasing the number of photovoltaic cells on each solar panel, the power budget of the artificial satellite is expanded, resulting in the ability to support a higher quantity and higher quality of on-board sensors. Advantageously, the hinge-lock mechanism of the present invention is operable to reduce the footprint of prior art hinges and locks by at least 50% (i.e., take up 50% less panel area than prior art hinges and locks), which proportionally increase the photovoltaic cells that are added to each panel.

In one embodiment, the increase in power produced by the solar array as a result of implementation of the hinge-lock 100, the artificial satellite is operable to support a mounted camera array. In one embodiment, the mounted camera array includes 100-200 small commercial off the shelf (COTS) 25-megapixel (MP) cameras (i.e., cameras operable to produce an image with a resolution of 24,000,000 pixels) with an exposure duration of 1 minute (1 frame per minute). In one embodiment, this configuration produces 250 GB of data per hour. In one embodiment, the exposure duration is six seconds. In one embodiment, the present invention utilizes Machine Learning (ML) to detect miniscule changes in star brightness due to transits. In one embodiment, the sensor data is processed on the satellite using edge computing powered by the solar arrays of the satellite.

In one embodiment, the increase in power produced by the solar array, as a result of the implementation of the hinge-lock 100, the artificial satellite is operable to power a Red, Blue, and Green (RGB) video telescope, hyperspectral sensor, ultraviolet telescope, infrared spectrometer, and/or Automatic Identification System (AIS) receiver. In one embodiment, the artificial satellite is operable to power a RGB video telescope, hyperspectral sensor, ultraviolet telescope, infrared spectrometer, and/or AIS receiver simultaneously. In one embodiment, the satellite is operable to power at least one RGB video telescope operable to record 8K full-color video. In one embodiment, the satellite is operable to power at least one hyperspectral sensor operable to produce 5-meter resolution hyperspectral imaging. In this embodiment, the hyperspectral sensor is operable to produce chemistry data for agriculture, security, energy, and environmental monitoring. The hyperspectral sensor is further operable to collect up to approximately 440 bands of spectral data.

In the preferred embodiment, the hinge-lock 100 of the present invention is attached to a hardpoint between face sheets of a solar panel. For clarity, the hardpoint of the solar panel is in reference to a location on a structural frame designed to transfer force throughout the structure to enable stronger mounting. In one embodiment, the hardpoint is created by attachment of an additional panel onto the solar panel. In another embodiment, the hardpoint is integrally formed into the solar panel. Advantageously, by attaching the hinge-lock 100 to the hardpoint of a panel, the hinge-lock 100 takes up a small area of the panel, which makes room for more photovoltaic cells. In this embodiment, the honeycomb material of the solar panel is removed to allow the hardpoint to be bonded between the panel face sheet. In one embodiment, the hardpoint is bonded between the panel face sheet through any physical attachment means, such as a pin, bolt, screw, nail, and/or friction-based locking component, and/or any chemical attachment means known in the art. The hardpoint extends several characteristic dimensions into the panel without disturbing the face sheets of the panel. The hinge-lock 100 is bonded to the edge of the hardpoint by a plurality of attachment means through the counterbores, such that the attachment ears of the hinge-lock 100 cover the hardpoint edge. Advantageously, this configuration reduces peel loads and cleavage of the structure bond. Additionally, this configuration enables the hinge-lock 100 to occupy little area of the surface of the panel, while transferring loads through the hinge-lock 100 to the hardpoint of the panel and into the large area of the face sheet of the panel. Advantageously, the hardpoint extends further into the center of the panel than a traditional potted insert design, allowing for load to be distributed across a larger area and reducing potentially damaging stresses. Therefore, the footprint of the hinge-lock 100 on the panel is minimized, which maximizes the area available for solar cells, while maintaining structural integrity. In one embodiment, the footprint of the hinge locks 100 is reduced by a factor of at least 50% relative to prior art systems.

Figure 2A:
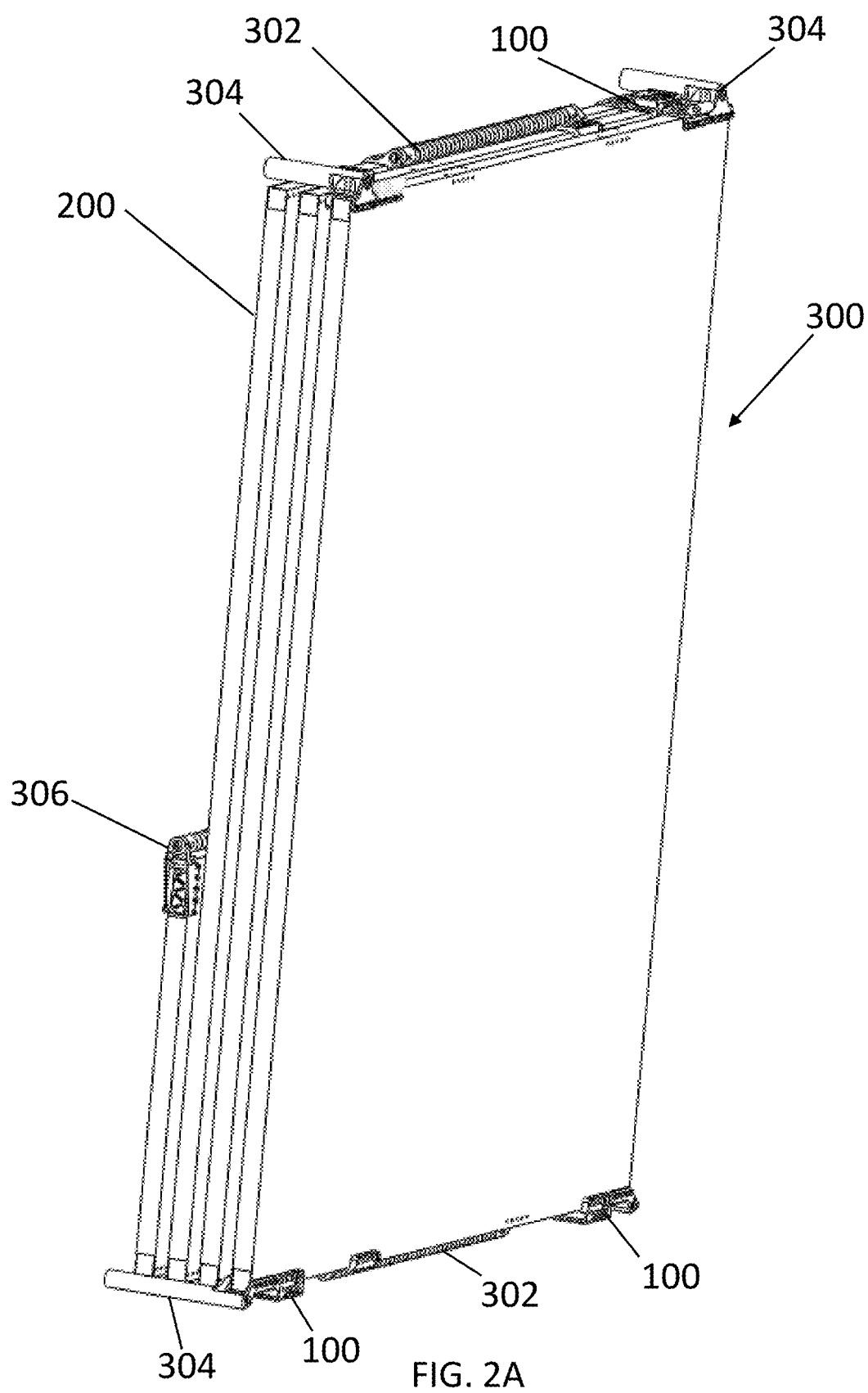
FIG. 2A illustrates a perspective view of an array of solar panels in a stowed position according to one embodiment of the present invention.

FIG. 2A illustrates a perspective view of an array of solar panels 300 in a stowed position according to one embodiment of the present invention. A solar panel array 300 includes a plurality of panels 200 connected by at least one hinge-lock 100, at least one passive release beam 302, a plurality of hold-down brackets 304, and/or at least one slip ring bracket 306. In a preferred embodiment, in a stowed position, the plurality of panels 200 are oriented in a substantially parallel manner. However, one of ordinary skill in the art will understand that embodiments are also contemplated in which the panels 200 are not entirely parallel and oriented at an angle to one another. The passive release beam 302 is operable to supply the requisite force for deployment of the solar array 300 without the aid of a motor. In one embodiment, the passive release beam 302 is a helical beam flexure. For clarity, the passive release beam 302, is a passive release mechanism because it does not require any external force to facilitate deployment of the solar array 300. Rather, the passive release beam 302 holds the necessary deployment energy while the hold-down brackets 302 are in place and passively release the deployment energy when the hold-down brackets 302 are removed, detached, etc. In one embodiment, the artificial satellite does not include a motor to deploy the solar array. The plurality of hold-down brackets 302 are operable to connect the solar array 300 to a body of the artificial satellite while the solar array 300 is in the stowed position. The plurality of hold-down brackets 304 include a rod having a central axis substantially perpendicular to the surfaces of the plurality of panels 200 (i.e., parallel to the stacking direction of the panels), and are attached to the ends of the plurality of panels 200 and a base of the artificial satellite, such that the plurality of panels 200 are restricted from movement until the hold-down brackets are released during deployment. The plurality of hold-down brackets 304 are operable to resist the force of the passive release beam 302 while the solar array 300 is in a stowed position. Upon deployment, the plurality of hold-down brackets 304 are detached, removed, and/or otherwise cease to resist the passive release beam 302, causing deployment of the solar array 300. The plurality of hold-down brackets 304 are operable to resist the extending force of the passive release beam 302, until they are removed and/or detached. In one embodiment, the plurality of hold-down brackets 304 are of a strength and stiffness to resist movement of the plurality of panels 200 during a launch of the artificial satellite and the torsion force of the passive release beam 302. For clarity, FIG. 2B and FIG. 2C illustrate zoomed-in or focalized views of FIG. 2A, showing the passive release beam 302 and hinge locks 100, respectively.

Figure 2B:
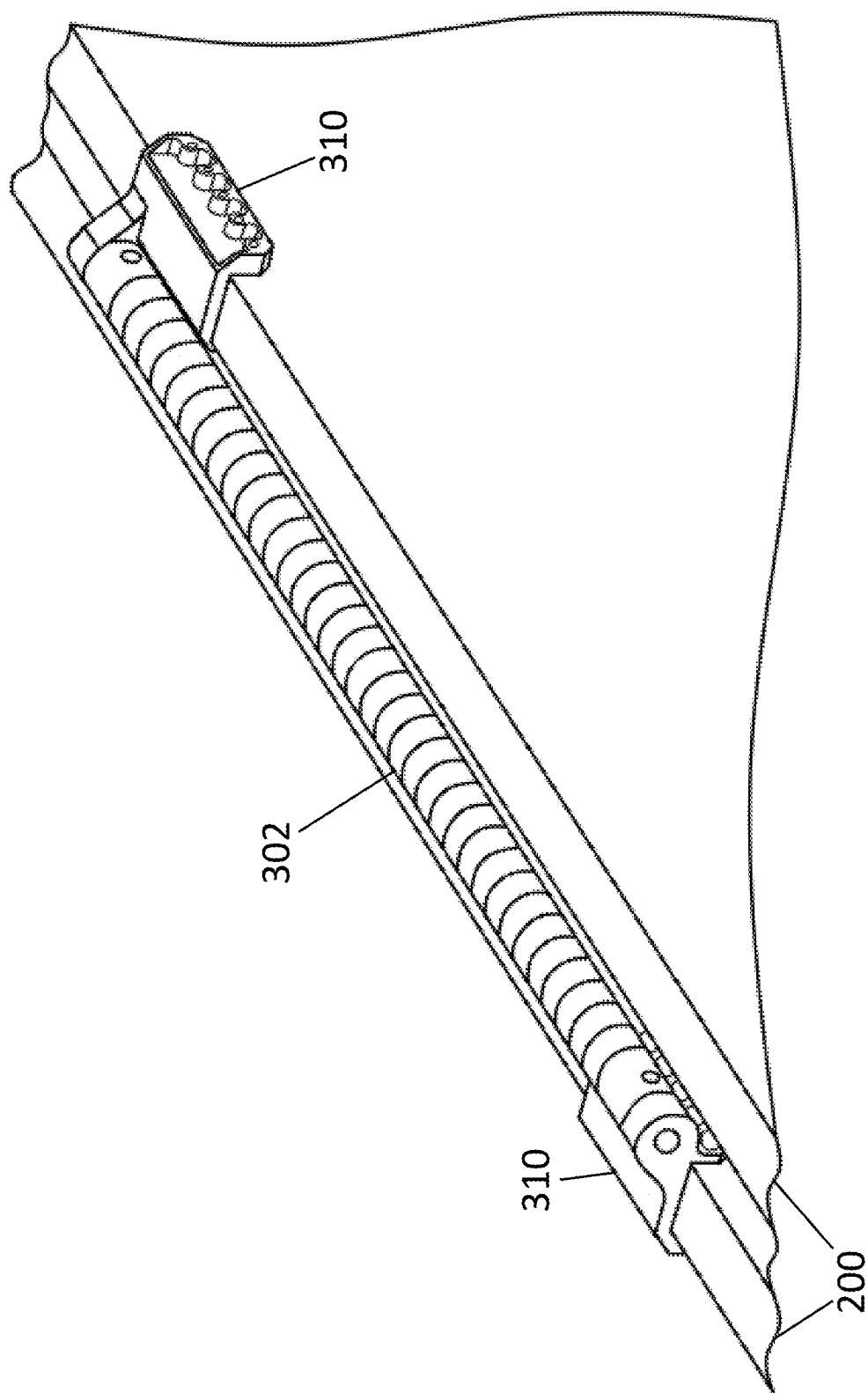
FIG. 2B illustrates a perspective view of a helical beam flexure according to one embodiment of the present invention.

FIG. 2B illustrates a perspective view of a passive release beam 302 according to one embodiment of the present invention. In one embodiment, the passive release beam 302 is attached to at least two panels 200 by at least two attachment brackets 310. In one embodiment, the attachment brackets 310 facilitate attachment of the passive release beam 302 to the panels 200 by any physical attachment means, such as a pin, bolt, screw, nail, and/or friction-based locking component, and/or any chemical attachment means known in the art. The passive release beam 302 includes an elongated spring having a compression axis substantially parallel to a top edge of one or more adjacent panels 200 and is attached to the attachment brackets 310 on the ends of the elongated spring. In one embodiment, the elongated spring varies in thickness and in length. In a preferred embodiment, the elongated spring varies in thickness and in length depending in part on substrate layer thickness. The passive release beam 302 is operable to provide the extending force for deployment of the solar array through torsion force of a spring of the beam, such that the ends of the spring twist in opposite directions upon release. In one embodiment, the passive release beam 302 is configured to have preloaded torsional strain necessary to deploy the solar array. The passive release beam 302 is configured to be in a torsionally strained and loaded state while the solar array is stowed or in a folded position and configured to move toward a more relaxed state during deployment of the solar array. Advantageously, the inclusion of the passive release beam 302 obviates the need for a motor to extend the solar array because the passive release beam 302 is configured with a preload to provide an extending force. In one embodiment, the extending force of the passive release beam 302 is caused by an unwinding or torsion force of the spring of the passive release beam 302. The spring of the passive release beam 302 is configured to release torsional energy and provide the extending force that deploys the solar array of the artificial satellite.

Figure 2C:
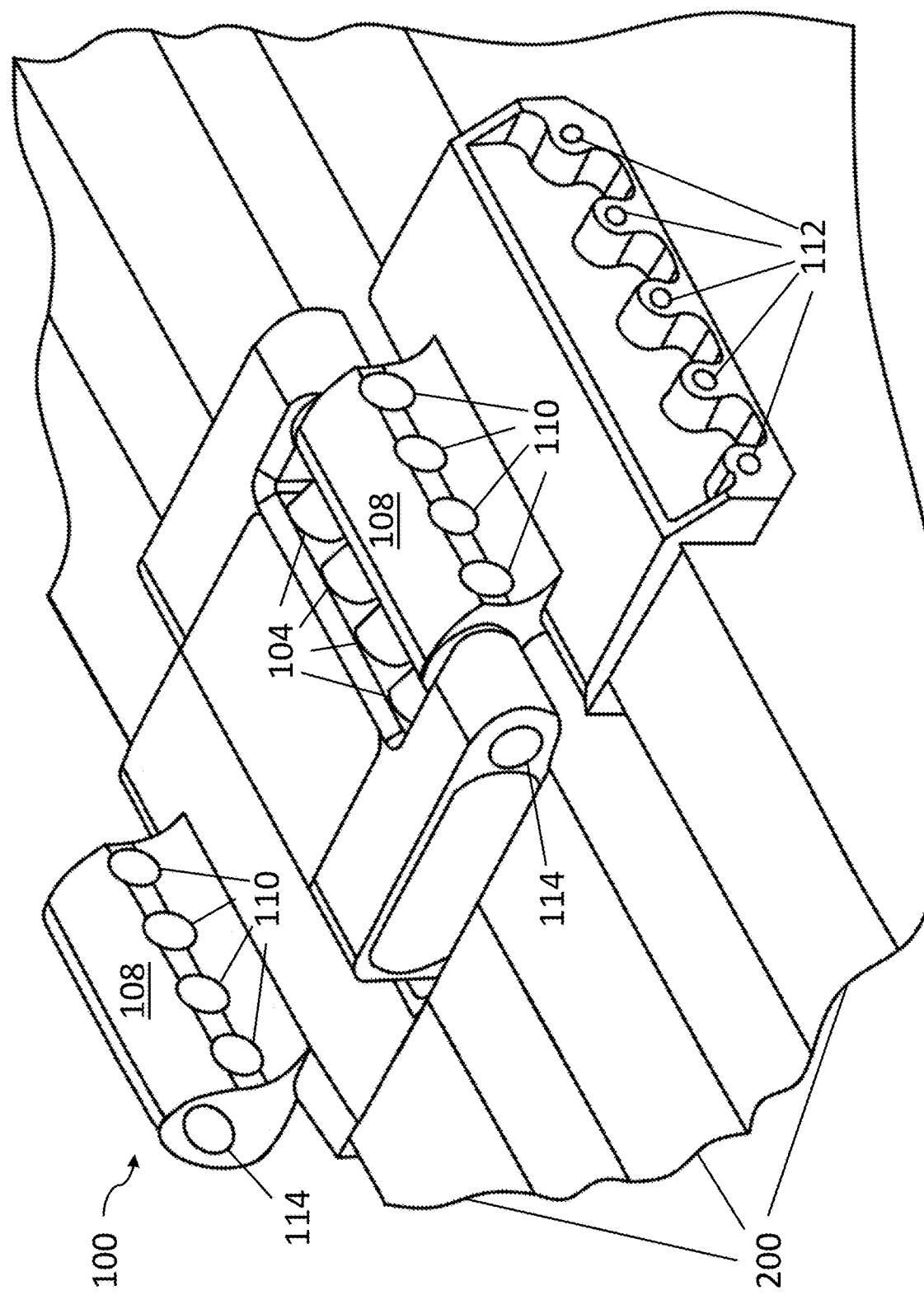
FIG. 2C illustrates a perspective view of a plurality of hinge-lock mechanism in a folded position according to one embodiment of the present invention.

FIG. 2C illustrates a perspective view of a plurality of hinge-lock mechanism in a folded or stowed position according to one embodiment of the present invention. In one embodiment, the hinge-lock mechanism includes a plurality of hinge-locks 100 operable to facilitate stowing of the solar array and deployment of the solar array. In one embodiment, the hinge-lock 100 includes two main components, a female component with receiving cantilevered hinge bore 110 and a male component with projecting tapered pins 104. However, both male and female components include attachment ears 102 to receive a plurality of panels. In one embodiment, the male component includes an integrally formed hinge pin to extending into a hinge pin receiving hole 114 of the corresponding female component. In one embodiment, both the female component and the male component include a hinge pin receiving hole 114 operable to receive a hinge pin that extends through the hinge pin receiving hole 114 of the female component and the hinge pin receiving hole 114 of the male component, facilitating the attachment. The hinge-lock 100 includes at least one tapered pin 104, a cam of a common hinge pivot point 108, at least one cantilevered hinge bore 110, at least one counterbore 112, and/or at least one hinge pin receiving hole 114. The at least one tapered pin 104 includes an internal spring operable to exert an extending force to push the tapered pin 104 into a corresponding cantilevered hinge bore 110 upon deployment. Upon the tapered pin 104 extending into the cantilevered hinge bore 110, the solar array is locked in a deployed position. Prior to deployment, the tapered pin 104 rests against the conical surface the cam of the common hinge point 108. The cam of the common hinge point 108 is of a specific round contour or a radially increasing contour, such that the internal spring of the tapered pin 104 is increasingly compressed as the solar array deploys. Advantageously, as the panels deploy, the contour of the cam moves closer to the tapered pin 104, eventually causing compression of the tapered pin 104, causing transfer of the kinetic energy of the deployment of the solar array into potential energy of the spring of the tapered pin 104, such that no component is damaged during deployment and the impact of deployment is reduced. This is accomplished because, due to the contour of the cam, the cam pushes against the tapered pin 104 as the hinge-lock 100 deploys. The cam is configured to push against the tapered pin more as the hinge-lock 100 deploys, until max compression is achieved just before the hinge lock 100 reaches a locked position. In one embodiment, this mechanism obviates the need for a separate damper, as the kinetic energy of deployment is partially absorbed by the spring of the tapered pin. In one embodiment, the hinge-lock 100 is operable to transfer kinetic energy of deployment of the solar array into potential energy of the spring compression of the tapered pin 104. In one embodiment, the stored compression force of the tapered pin 104 caused by deployment of the solar array is released upon the full deployment of the solar array, such that the hinge-lock 100 locks the solar array in a deployed position. In one embodiment, the male portion of the hinge-lock 100 includes two hinge pin receiving holes 114 configured to enclose the hinge pin receiving hole 114 of the female portion, as illustrated in FIG. 2C. In this embodiment, the two hinge pin receiving holes 114 of the male portion are aligned with the hinge pin receiving hole 114 of the female portion, such that a hinge pin is able to pass through all three hinge pin receiving holes 114 and facilitate attachment of the two portions of the hinge-lock 100 such that the male and female portion are able to pivot about the common pivot point 108.

Figure 3:
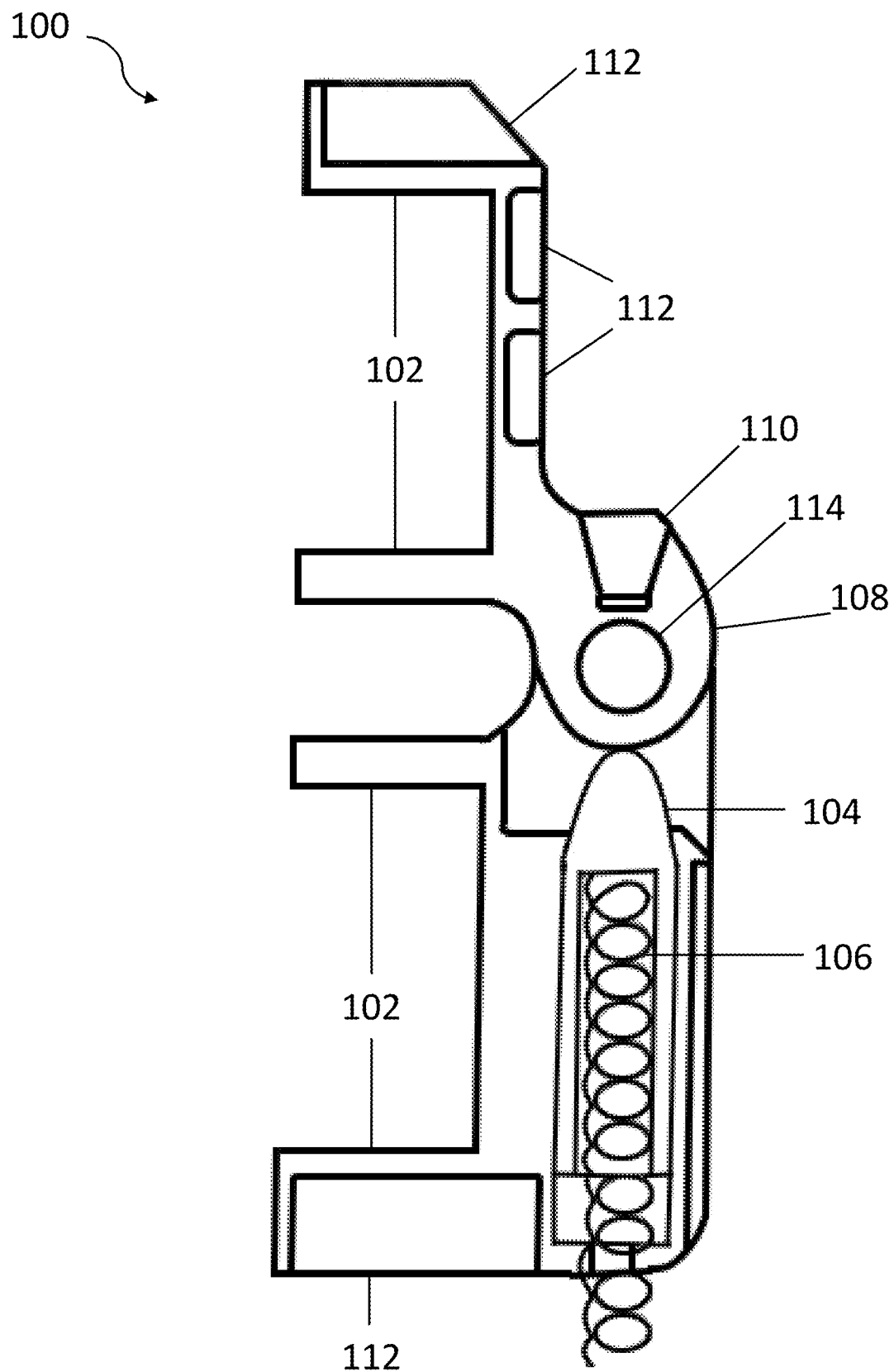
FIG. 3 illustrates a cross-sectional view of a hinge-lock in a folded position according to one embodiment of the present invention.
Figure 5:
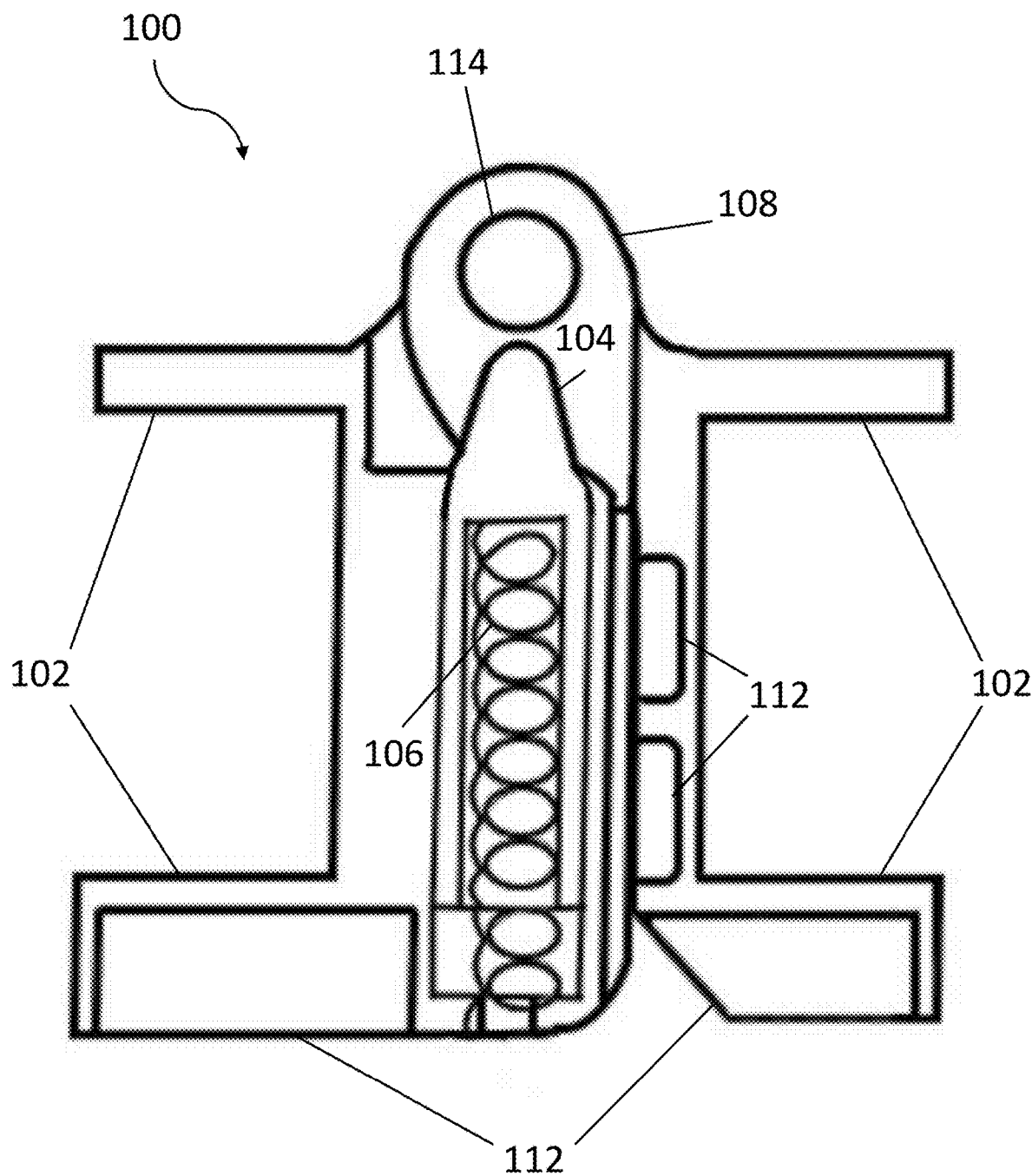
FIG. 5 illustrates a cross-sectional view of a hinge-lock in a deployed position according to one embodiment of the present invention.

FIG. 3 illustrates a cross-sectional view of a hinge-lock 100 in a folded position according to one embodiment of the present invention. In one embodiment, the present invention includes a hinge-lock 100 and/or a plurality of hinge-locks 100 operable to facilitate deployment of a plurality of solar panels. In one embodiment, when the hinge-lock 100 is in a folded position, the solar panels connected by the hinge-lock are stowed in parallel or substantially parallel, stacked position. This allows for the satellite including the solar array to be compact prior to deployment of the solar array in orbit. The hinge-lock 100 includes at least one female ear 102, sometimes referred to as the "female hinge half", which features at least one counterbore 112 operable to receive an attachment means. In one embodiment, the cam of the common pivot point 108 includes a cantilevered hinge bore 110. In the preferred embodiment, the attachment ear 102 includes a counterbore 112 on a first lip of the attachment ear 102 and a corresponding counterbore 112 on a second lip of the attachment ear 102, such that the counterbores 112 are aligned to allow an attachment means, such as bolt or screw, to pass through both counterbores 112. In one embodiment, each counterbore 112 of each lip of the female ear 102 includes a corresponding counterbore 112 on another lip of the female ear 102, such that a single bolt or screw is threaded into both counterbores 112 and through the panel being attached. Attachment means according to the present invention include any physical attachment means, such as a pin, bolt, screw, nail, and/or friction-based locking component, and/or any chemical attachment means known in the art. In one embodiment, the counterbore 112 is a depression in the female ear 102, such that attachment means extending through the counterbore 112 and into the solar panel rests within the counterbore, thereby creating a flush surface that is even or level with the surface or forming the same plane. In one embodiment, the counterbore 112 is an extension from a depression of the female ear 102, such that the attachment means is provided with a longer threaded hole for increased strength and stability. The hinge-lock 100 also includes at least one tapered pin 104 which includes at least one spring 106, a cam of a common hinge pivot point 108 created by a connection between two circular ends of two female ears 102 resulting in a cam mechanical linkage, a cantilevered hinge bore 110, at least one counterbore 112 configured to receive tapered conical pins, and/or a hinge pin receiving hole 114. In one embodiment, the hinge pin receiving hole 114 is operable to receive a hinge pin to connect to female ear halves 102. The cam of the common hinge pivot point 108 is a common point of rotation of the hinge-lock 100. The cam of the hinge-lock 100 is of a specific rounded contour such that as the hinge-lock 100 deploys, the spring 106 of the tapered pin 104 is compressed until the hinge-lock 100 is in the deployed position (as illustrated in FIG. 5) where the tapered pin is extended, by the force of the spring 106, into the cantilevered hinge bore 110. In one embodiment, the cam of the common hinge pivot point 108 is of an asymmetrical oval or "egg" shape. In one embodiment, the common pivot point 108 and/or cam is a symmetrical oval and rotates around the hinge pin receiving hole 114. In this embodiment, the hinge pin receiving hole 114, upon which the pivot point 108 and/or cam rotates about, is not placed in the center of the oval, rather the hinge pin receiving hole 114 is placed closer to one vertex of the major axis of the oval. In this way, as the hinge-lock 100 deploys and rotates about the pivot point 108, the spring 106 of the tapered pin 104 is increasingly compressed as the tapered pin slides against a first vertex along the major axis of the symmetrical oval shaped pivot point 108 to a second vertex of the symmetrical oval shaped pivot point 108. In one embodiment, the cam of the common pivot point 108 is configured to radially increase, in reference to the side resting against the tapered pin 104, as the hinge-lock deploys. In one embodiment, the cam of the common pivot point 108 is an elliptical, oblong, ovate, ovoid, or pear shape. In one embodiment, the cam of the common pivot point 108 is symmetrically circular.

In one embodiment, the cantilevered hinge bore 110 is positioned around the cam of a common hinge pivot point 108 at different radial positions. Adjusting the radial position of the cantilevered hinge bore 110 changes the angle of the solar panel deployment. In one embodiment, the cantilevered hinge bore 110 can be positioned around the cam of the common hinge point 108 such that the solar panel deploys at an angle of about 180 degrees. In another embodiment, the cantilevered hinge bore 110 can be positioned around the cam of the common hinge point 108 such that the solar panel deploys at an angle of about 135 degrees. In yet another embodiment, the cantilevered hinge bore 110 can be positioned around the cam of the common hinge point 108 such that the solar panel deploys at an angle of about 90 degrees. In yet another embodiment, the cantilevered hinge bore 110 can be positioned around the cam of the common hinge point 108 such that the solar panel deploys at an angle of about 45 degrees. In another embodiment, the cantilevered hinge bore 110 can be positioned around the cam of the common hinge point 108 such that the solar panel deploys at an angle of about 0 to 90 degrees. In another embodiment, the cantilevered hinge bore 110 can be positioned around the cam of the common hinge point 108 such that the solar panel deploys at an angle of about 90 to 135 degrees. In yet another embodiment, the cantilevered hinge bore 110 can be positioned around the cam of the common hinge point 108 such that the solar panel deploys at an angle of about 135 to 180 degrees. In yet another embodiment, the cantilevered hinge bore 110 can be positioned around the came of the common hinge point 108 such that the solar panel deploys at an angle of about 0 to 180 degrees.

In one embodiment, the hinge-lock 100 includes two female ears 102 configured to receive panels such as solar panels. The two female ears 102 are configured to receive the panels, such that the depth of the panel is sandwiched between two extending members of the female ear 102 and the panels are connected. In one embodiment, the female ear 102 includes a plurality of counterbores 112, such that connection of the panel to the hinge-lock 100 through a pin, bolt, screw, and/or similar attachment means results in a flush surface, meaning that the attachment means does not extend past a surface of the female ear. Advantageously, by including a flush surface the hinge-lock 100 is enabled to fold completely without having extending attachment means, such as bolts or screws, extending outwards and limiting how far the hinge-lock 100 is able to fold. This is illustrated in FIG. 5. The cantilevered hinge bore 110 is positioned on the common hinge pivot point 108, such that when the hinge-lock 100 is in the folded configuration, the cantilevered hinge bore 110 faces opposite the tapered pin 104 (i.e., 180 degrees from the tapered pin 104). While in a folded position, the hinge-lock 100 is configured such that a smooth conical end or bullet-shaped head of the tapered pin 104 rests against a rounded portion of the cam of the common hinge pivot point 108. Although the tapered pin 104 is shown with a rounded head in FIG. 3, the tapered pin 104 is operable to be of any size and/or shape to match the size and/or shape of the cantilevered hinge bore 110. The tapered pin 104 includes a spring 106, which is a compression in FIG. 3. The compression spring 106 is configured to be in a compressed state when the hinge-lock 100 is in a folded position as illustrated in FIG. 3, and is configured to be in a relaxed state when the hinge-lock 100 is in a deployed position as illustrated in FIG. 2. In one embodiment, the spring 106 is in a semi-compressed state (i.e., not fully relaxed) in both the stowed and deployed position. In this embodiment, the spring 106 is more compressed in the stowed state than in the deployed state, yet exhibits an extending force even when in the deployed state. When folded as illustrated by FIG. 3, the solar panels are parallel to one another. In one embodiment, despite the hinge-lock 100 being in a deployed position, the spring 106 still exerts compressive force into the cantilevered hinge bore 110 to ensure that the hinge-lock 100 is prevented from refolding following deployment.

One of ordinary skill in the art will understand that various aspects of the hinge lock 100 are able to be altered in line with the present invention, depending on the intended application and configuration of the system. For example, the number of tapered pins and diameter of each tapered pin are able to be varied as the situation demands, depending on anticipated stresses on the mechanism and/or other concerns. Additionally, the spring rate of the spring for the tapered pins is able to be varied as the weight of the panels and/or anticipated forces in the mechanism are anticipated to change. One of ordinary skill in the art will understand that the number of hinge locks is also able to be varied depending on the size of the panels, the number of panels, the materials used, and/or other factors. Furthermore, the profile of the cam that actuates the pins is able to be changed as the situation demands. For clarity, the present invention contemplates embodiments, where the cam of the hinge-lock is sharply elliptical, resulting in a greater compression of the spring, our softly elliptical, resulting in a weaker compression of the spring. The materials used for both the tapered pins and the hinge body are able to be varied according to the anticipated environments, stresses, required stiffness, and/or other properties of the mechanism. By way of example and not limitation, the tapered pins and the hinge body are able to be formed from one or more metal materials, such as aluminum, steel, titanium, and/or alloys of one or more metals, and/or composite materials, such as carbon fiber, fiberglass, basalt fiber, and/or other composite materials. In one embodiment, busing material is able to be added between the hinge and the main hinge pin or axel about which the hinge rotates during deployment.

Figure 4A:
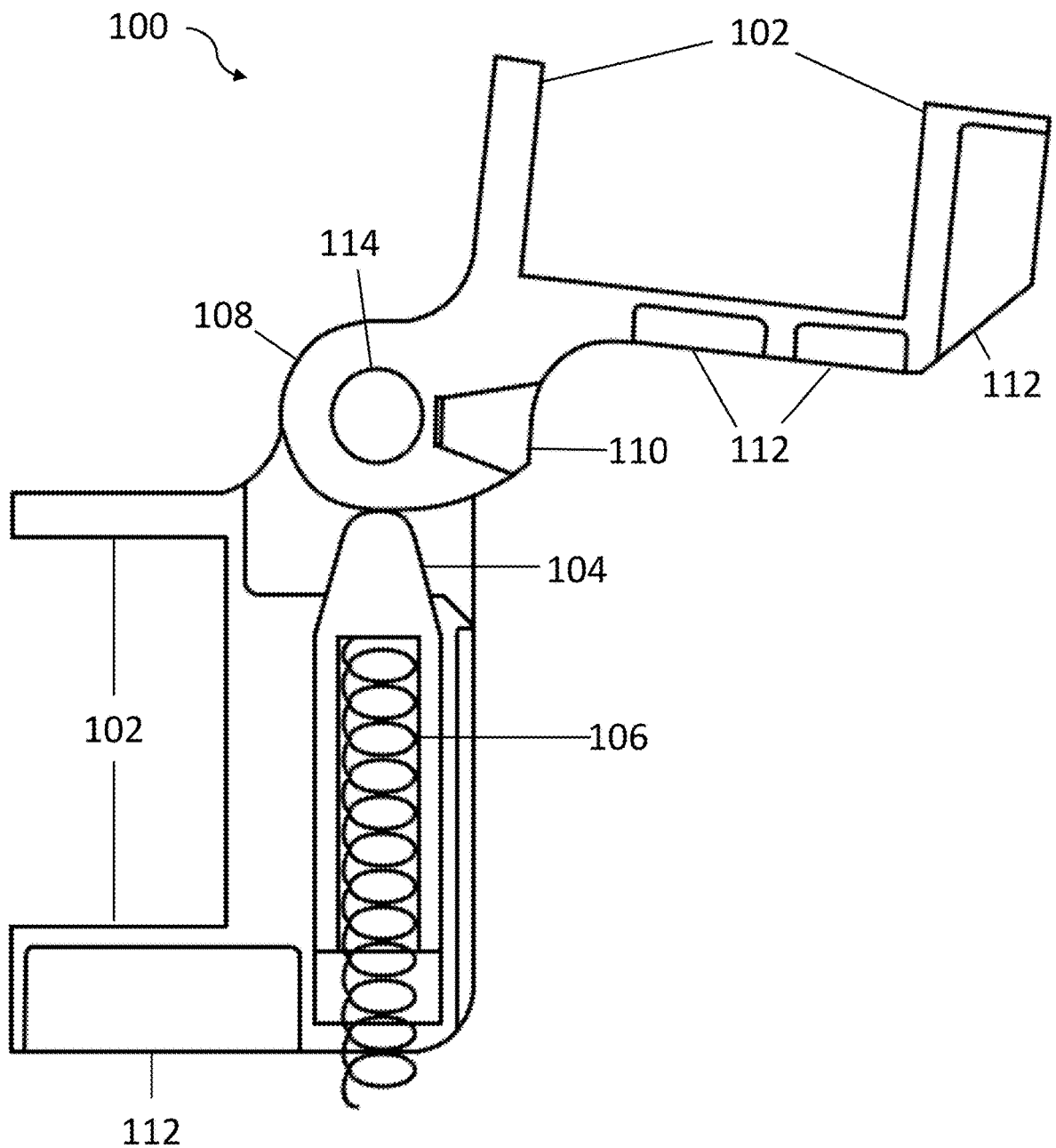
FIG. 4A illustrates a cross-sectional view of a hinge-lock during deployment according to one embodiment of the present invention.
Figure 4B:
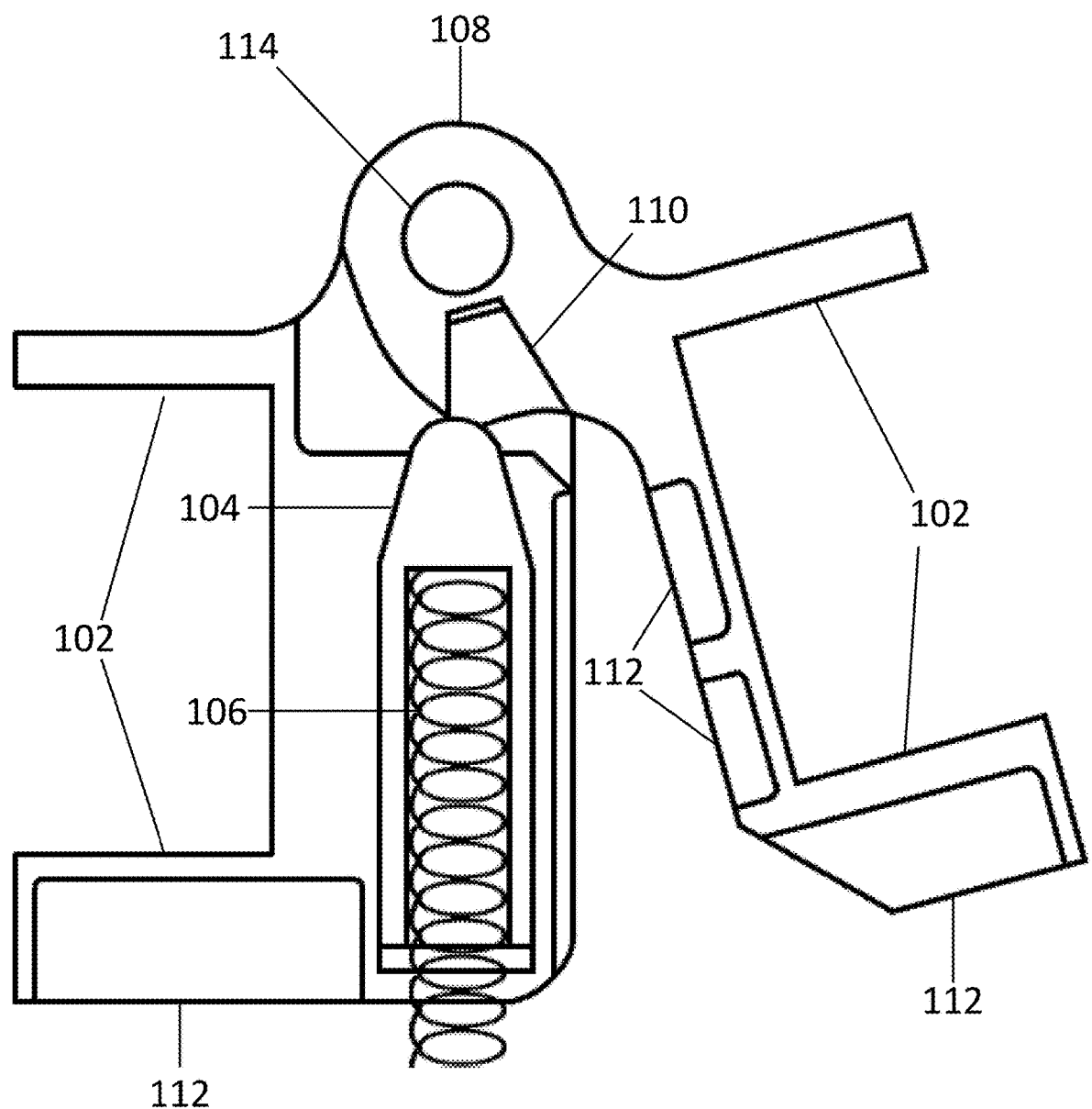
FIG. 4B illustrates a cross-sectional view of a hinge-lock during deployment according to one embodiment of the present invention.

FIGS. 4A-4B illustrates cross-sectional views of a hinge-lock 100 during deployment according to one embodiment of the present invention. FIGS. 4A-4B illustrate positions of the hinge-lock 100 as it transitions from a stowed position (FIG. 3) to a deployed position (FIG. 5). FIGS. 4A-4B further illustrate the transfer of kinetic energy caused by panel deployment to spring compression energy, such that the kinetic energy of the plurality of panels upon deployment is reduced. FIGS. 4A-4B further illustrate how the hinge-lock 100 is operable to facilitate the functions of a damper, spring, and lock mechanism in a single device. In one embodiment, the cam of the common pivot point 108 is configured to be of an oval shape, which rotates about an off-centered hinge-pin receiving hole 114. In this embodiment, the uneven rotation of the common pivot point 108, upon which the tapered pin 104 rests, causes the tapered pin 104 to be pushed down (in reference to FIGS. 4A-4B) as the hinge-lock 100 unfolds. This is illustrated in FIG. 4A, where the hinge-lock 100 is at a substantially 90-degree angle, in this position, the spring 106 of the tapered pin 104 is more compressed than when in the folded and/or stowed position illustrated in FIG. 3. FIG. 4B illustrates the hinge-lock 100 in a partially deployed position, and illustrates the point at which the spring 106 of the tapered pin 104 is most compression. Advantageously, by configuring the common pivot point 108, such that the spring 106 of the tapered pin 104 is most compressed right before locking into the deployed position, the spring of the tapered pin 104 absorbs increasingly more energy as the hinge-lock 100 transitions closer to the deployed position. This results in a dissipation of the kinetic energy caused by deployment, such that the solar panels are not damaged from the force of deployment. Stated otherwise, the velocity of the panels is reduced by the compression of the spring 106. Further stated otherwise, the hinge-lock 100 is operable to trade the kinetic energy of the panels during deployment for potential energy stored in the spring 106. In one embodiment, FIG. 3 illustrates the hinge-lock 100 where the female portion of the hinge-lock 100 is at approximately a 180-degree angle relative to the male portion of the hinge-lock 100, FIG. 4A illustrates the female portion of the hinge-lock 100 is at approximately a 90-degree angle relative to the male portion of the hinge-lock 100, FIG. 4B illustrates the female portion of the hinge-lock 100 is at approximately a 10-degree angle relative to the male portion of the hinge-lock 100, and FIG. 5 illustrates the female portion of the hinge-lock is at approximately a zero-degree angle relative to the male portion of the hinge-lock 100.

FIG. 5 illustrates a cross-sectional view of a hinge-lock 100 in a deployed position according to one embodiment of the present invention. In one embodiment, once the hinge-lock 100 is deployed, the hinge-lock 100 is permanently locked in the deployed position and is prevented from refolding by the spring 106 forcing the tapered pin 104 into the cantilevered hinge bore. The configuration of the tapered pin 104, internal spring 106, the common hinge pivot point 108, and the cantilevered hinge bore 110 when the hinge-lock 100 is in a deployed position enable the hinge-lock 100 to permanently maintain a locked-state following unfolding.

The spring 106 exerts a restoring force on the tapered pin 104 that causes the tapered pin 104 to push against the cam of the common hinge pivot point 108. The cantilevered hinge bore is positioned on the cam of the common hinge pivot point 108, such that when the hinge-lock 100 is in the folded configuration, the cantilevered hinge bore 110 faces opposite the tapered pin 104 (i.e., 180 degrees from the tapered pin 104). This specific positioning of the cantilevered hinge bore 110 on the common hinge pivot point 108 is such that when the hinge-lock 100 is in the deployed configuration, the cantilevered hinge bore 110 faces the tapered pin 104, such that the spring 106 forces the conical tip of the tapered pin 104 to be injected into the cantilevered hinge bore 110 upon deployment. Stated otherwise, the cantilevered hinge bore 110 is configured to be on the opposite side of the cam of the common hinge pivot point 108 as the tapered pin 104 when the hinge-lock 100 is in a folded position and configured to be on the same side of the common hinge pivot point 108 as the tapered pin 104 when the hinge-lock 100 is in the deployed position. As the hinge-lock 100 is deployed, the cam of the common hinge pivot point 108 is in intimate contact with the tapered pin 104 and pushes the tapered pin 104 towards the hinge bore 110, compressing the coil spring. The cam of the common hinge pivot point 108 is shaped to absorb the kinetic energy caused by deployment by compressing the spring 106, also reducing the velocity of the deploying panel.

The hinge-lock 100 is operable to reduce the kinetic energy caused by panel deployment. When the hinge lock 100 moves from a stowed to a deployed position, the kinetic energy from the movements of the panels is reduced, as the potential energy stored within the spring 106 of the tapered pin 104 is increased. In this way, velocity of the moving panels 200 is reduced proportional to the energy absorbed by the spring 106 in the tapered pin 104. Energy is then dissipated in the mechanism as a result of friction between the tapered pin 104 and the bore 110, as well as between the tapered pin 104 and its own spring 106. Advantageously, by absorbing the energy of the deployment by the spring 106, the energy is utilized to lock the hinge-lock 100 into place.

When deployed as illustrated by FIG. 5, the solar panels are coplanar. Following deployment of the plurality of panels by the hinge-lock 100 transitioning into the deployed position, the hinge-lock 100 locks the panels in the deployed position, such that the panels lay substantially flat, side-by-side. In one embodiment, the hinge-lock 100 is operable to be permanently affixed in the locked position upon unfolding. Advantageously, by including a tapered pin 104 with a conical or bullet-like tip, the tapered pin allows, and does not resist, the pivot point 108 to pivot from a folded position (FIG. 1A) to a deployed position (FIG. 5), while including the locking capability. This is accomplished by the specific rounded contour of the cam of the common pivot point 108, which is contoured to encourage deployment, but abruptly stops at the hinge bore 110.

Once the tapered pin 104 is nested into the hinge bore 110, the spring 106 provides the force that mates the pin 104 to the bore 110 together. The conical surface of the tapered pin 104 prevents externally applied forces from back driving the pin out of its hole, locking the hinge. The overall stiffness of the hinge-lock 100 is proportional to the diameter of the conical surface of the tapered pin 104, the number of pins, and the preload of the spring 106. The conical surface of the tapered pin 104 is at an angle such that the force acting in the direction of the spring 106 is insufficient to overcome the friction of the tapered pin 104 in the bore 110. Advantageously, this angle enables the pin 104 to be locked without a preload spring. Therefore, the spring is an additional mechanical preload on the hinge-lock, further increasing mechanical stiffness of the mechanism.

The mechanism of the present invention places the tapered pin 104 in bending, which means that the stiffness of the tapered pin 104 is proportional to the $4^{th}$ power of the radius of the spin. Because of this, even small increases in the radius of the pin result in large increases in the stiffness of the pin and thus for the overall mechanism. For example, doubling the radius of the pin results in 16 times increase in stiffness. Advantageously, this configuration increases stiffness for small increases in pin diameter.

In one embodiment, the hinge-lock is operable to function with a series or a plurality of other hinge-locks, such that a plurality of panels are attached to one another through the hinge-locks. In one embodiment, a single hinge-lock is operable to connect two panels. In one embodiment, multiple hinge-locks are operable to connect two panels. In one embodiment, the plurality of hinge-locks are operable to connect a plurality of panels. In a preferred embodiment, two hinge-locks are used to connect two solar panels, repeatedly to result in a series of three to four connected solar panels, such as a solar array. In this preferred embodiment, there are two series of three to four panels connected to an artificial satellite or spacecraft through a slip ring. However, one of ordinary skill in the art will appreciate that the present invention is operable to include any number of hinge-locks 100 to connect any number of panels while maintaining the same folding and deploying functionality described herein. For clarity, while the present application may describe the functionality of the hinge-lock 100 in terms of connecting two solar panels with one hinge-lock 100, one of ordinary skill in the art will understand that the present description is not limited to any particular number of hinge-locks or panels. While the present invention is primarily discussed with respect to artificial satellites and solar panels, it is not limited to such uses. Rather, the present invention is operable to facilitate deployment of an antenna, photo array, radiator, and/or any other component of a satellite that is stowed during launch. One of ordinary skill in the art will also appreciate that the hinge-lock 100 functions with any panel-like structure or structure including a flat component for connecting to the hinge-lock 100 and is not limited to solar arrays.

Advantageously, the present invention enables deployment of a solar array without the assistance of a motorized mechanism to full extend the solar array. Rather, the present invention provides a completely passive mechanical mechanism. The hinge-locking mechanism of the present invention is operable to fully deploy the solar array without a motorized mechanism. In one embodiment, the hinge-lock provides the connection between a slip ring of an artificial satellite to the panel array.

Figure 6:
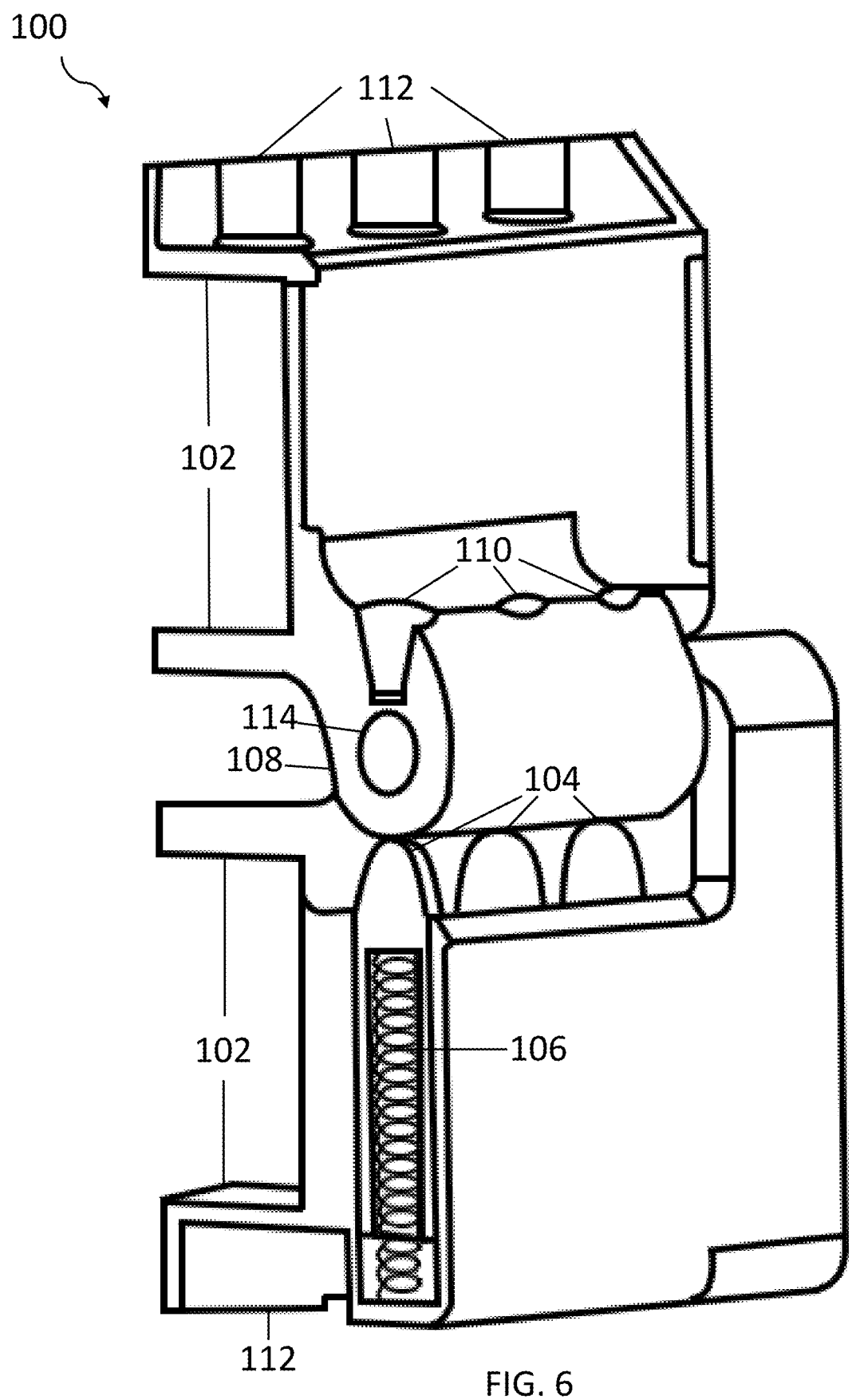
FIG. 6 illustrates a sectional view of a hinge-lock according to one embodiment of the present invention.

FIG. 6 illustrates a sectional view of a hinge-lock 100 according to one embodiment of the present invention. FIG. 6 illustrates the adaptability of the present invention. In one embodiment, as illustrated in FIG. the hinge-lock 100 includes at least three tapered pins 104, at least three cantilevered hinge bores 110, and at least three counter bores 112 per female ear 102. However, given the semi-sectional view of the hinge-lock 100, one of ordinary skill in the art will appreciate the adaptability of the hinge-lock 100, by increasing the length of the hinge-lock 100, in turn increasing the number of tapered pins 104, cantilevered hinge bores 110, and/or counterbores 112 per female ear 102. Furthermore, one of ordinary skill in the art will appreciate that the present invention is further adaptable to includes tapered pins with a longer fit, to accompanying stiffer or longer springs 106. Additionally, the present invention allows for tapered pins 104 with a wider conical surface and/or larger diameter. Similarly, the hinge-lock 100 is operable to include at least one counterbore 112, at least three counter bores 112, or a plurality of counter bores 112. Advantageously, by providing for a highly-modifiable hinge-lock 100, the present invention is operable to modify the characteristics of the hinge-lock 100 by modifying the number of tapered pins 104, the diameter of tapered pins 104, the spring rate of the springs 106, the number of hinge-locks 100 per panel, the profile of the cam of the common pivot point 108 that actuates the pins 104, the material of the pins 104, the material of the body of the female ear 102, and/or by including bushing material of the hinge pin receiving hole 114. In one embodiment, a body of the female ear component houses a plurality of tapered pins 104. In one embodiment, the hinge-lock 100 includes a female portion, including the cam of the common pivot point 108 and the cantilevered hinge bores 110, and a male portion housing the tapered pins 104. In this embodiment, the female portion includes a hinge pin receiving hole 114 operable to receive a corresponding hinge pin from the male portion, facilitating the connection and the pivot point. In one embodiment, both the female portion and the male portion include a hinge pin receiving hole, which are configured to be side-by-side to allow a hinge pin to enter both hinge pin receiving holes 114 to facilitate attachment of the female portion and the male portion and the pivot point.

Figure 7:
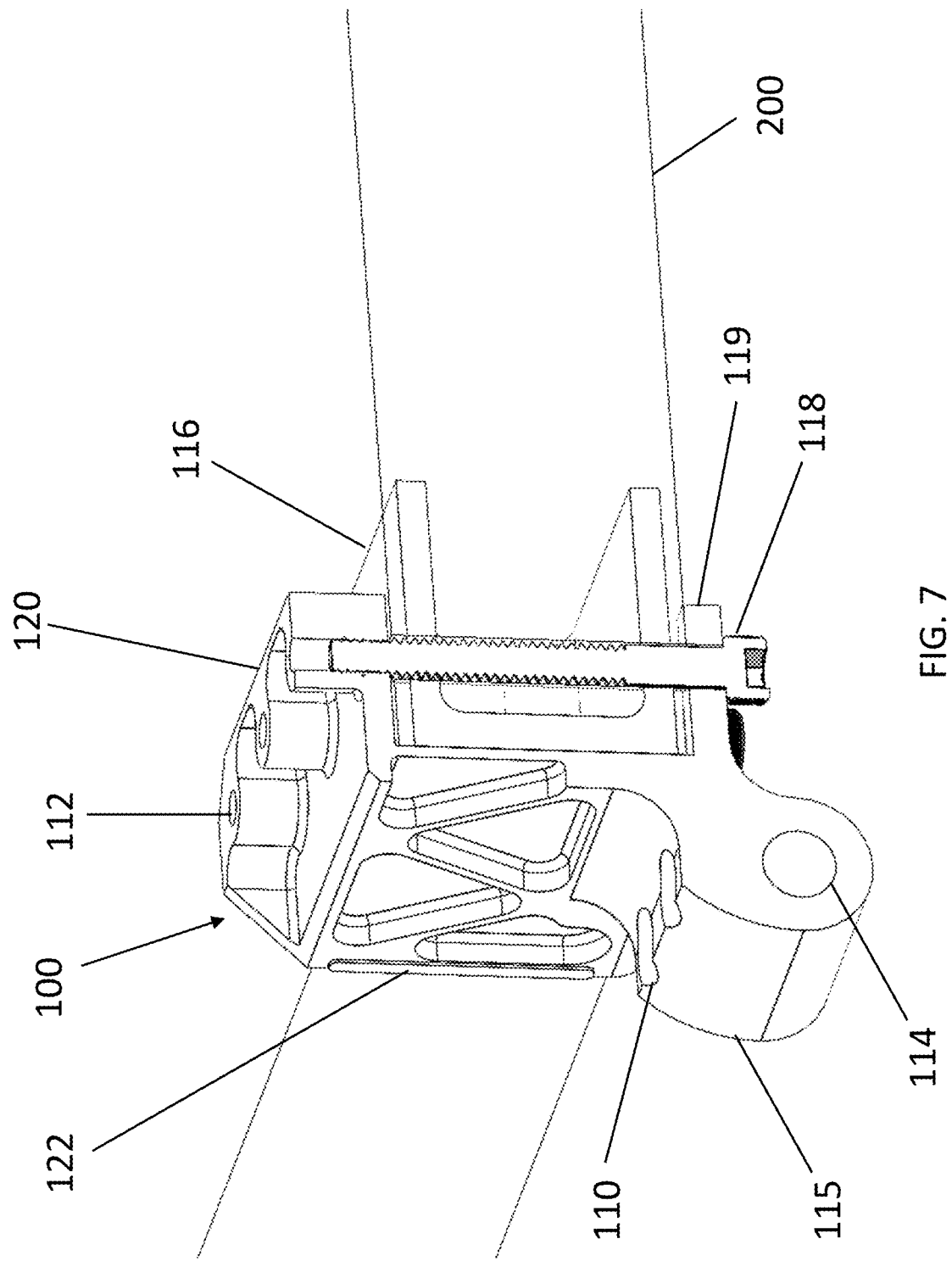
FIG. 7 illustrates a perspective view of a female component of a hinge lock attached to a panel according to one embodiment of the present invention.

FIG. 7 illustrates a perspective view of a female component of a hinge lock according to one embodiment of the present invention. In one embodiment, a female component 130 of a hinge lock is connected to a hardpoint 116 of a solar panel 200. In one embodiment, the female component 130 is connected to the hardpoint 116 by one or more bolts 118 extending through a first part 119 of the female component 130, positioned on a first side of the solar panel 200, through the solar panel hardpoint 116 into counterbores 112 of a second part 120 of the female component 130 positioned on a second side of the solar panel 200. However, one of ordinary skill in the art will understand that other connection mechanisms between the female component 130 of the hinge lock and the solar panel are also contemplated herein, including, but not limited to, adhesive, screws, welding, latches, and/or other acceptable mechanisms. The first part 119 and the second part 120 of the female component 130 are connected via at least one panel component 122 extending vertical between a first edge of the first part 119 and a first edge of the second part 120.

In one embodiment, a hinge pin receiving component 115, operable to receive a hinge pin connecting the female component 130 to a matching male component via at least one hinge pin receiving hole 114, extends outwardly from the at least one panel component 122 and/or the first part 119 of the female component 130. One or more cantilevered hinge bores 110 extend through an outer surface of the hinge pin receiving component 115 into the at least one hinge pin receiving hole 114, such that the one or more cantilevered hinge bores 110 is operable to receive one or more tapered pins from a corresponding mating male component. In one embodiment, as shown in FIG. 7, the one or more cantilevered hinge bores 110 have central axes that are substantially parallel. In one embodiment, the central axes of the one or more cantilevered hinge bores 110 are substantially parallel to the at least one bolt 118 connecting the first part 119 and the second part 120 of the female component 130.

Figure 8:
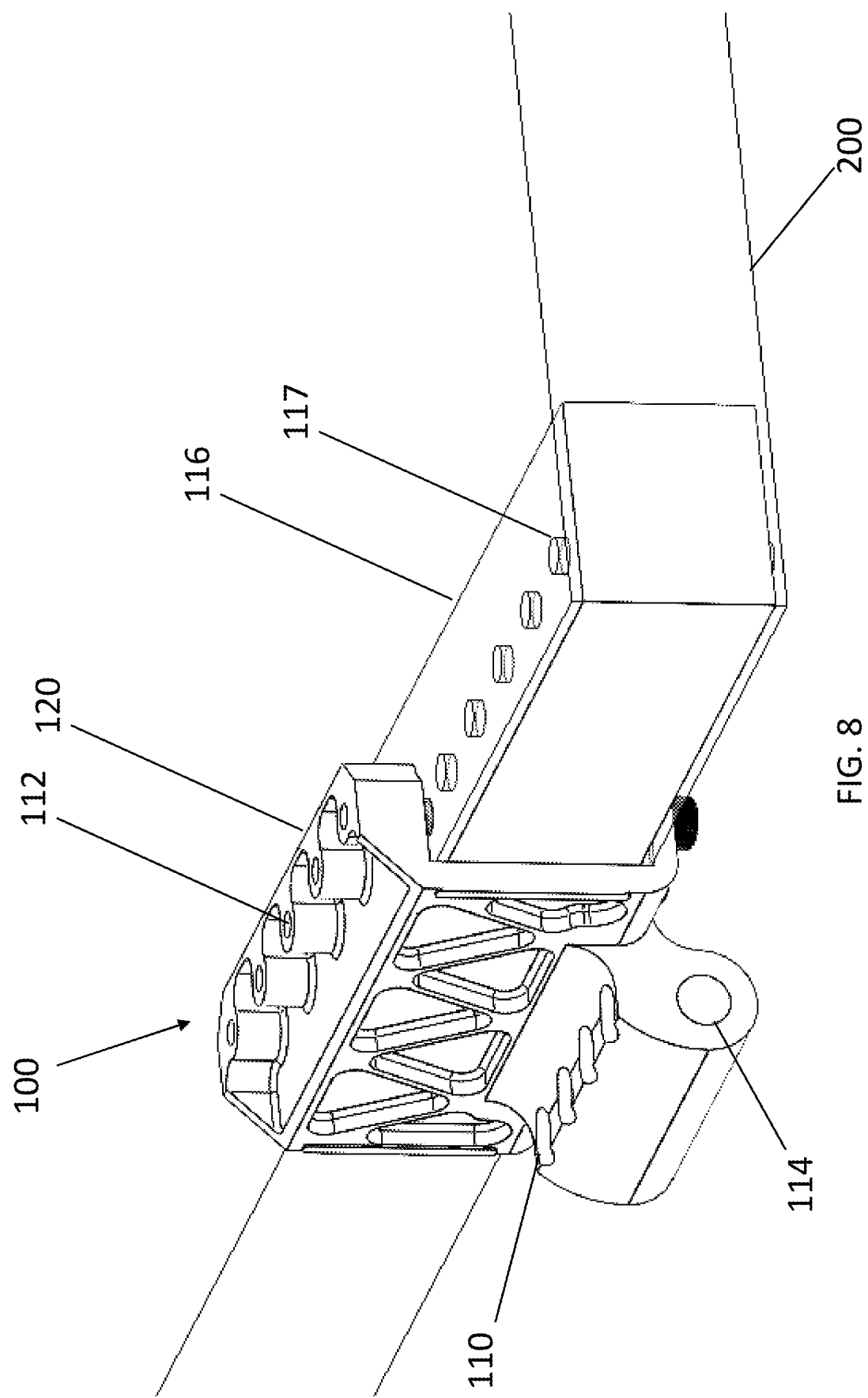
FIG. 8 illustrates a perspective view of a female component of a hinge lock attached to a panel according to another embodiment of the present invention.

FIG. 8 illustrates a perspective view of a female component of a hinge-lock 100 according to another embodiment of the present invention. In one embodiment, the hardpoint 116 includes a plurality of openings 117 each configured to receive a bolt, screw, and/or pin. In one embodiment, the female component 130 includes a plurality of counterbores 112 configured to receive bolts. However, the number of counterbores 112 for each female component 130 is able to be varied. For example, FIG. 7 shows a female component 130 having two counterbores 112, while FIG. 8 shows a female component 130 having four counterbores 112. In one embodiment the counterbores 112 are spaced substantially equally to or spaced as an inter multiple of the spacing between the plurality of openings 117 in the hardpoint 116 of the panel 200. In this way, the counterbores 112 are able to align with the openings 117 to allow the same bolt to extend through the openings 117 and the counter bores 112 to fix the female component 130 in place. In one embodiment, the hardpoint 116 includes a number of openings 117 greater than a number of counterbores 112 in the female component 130, thereby allowing the female component 130 to be adjusted to different position along the edge of the panel 200.

Figure 9:
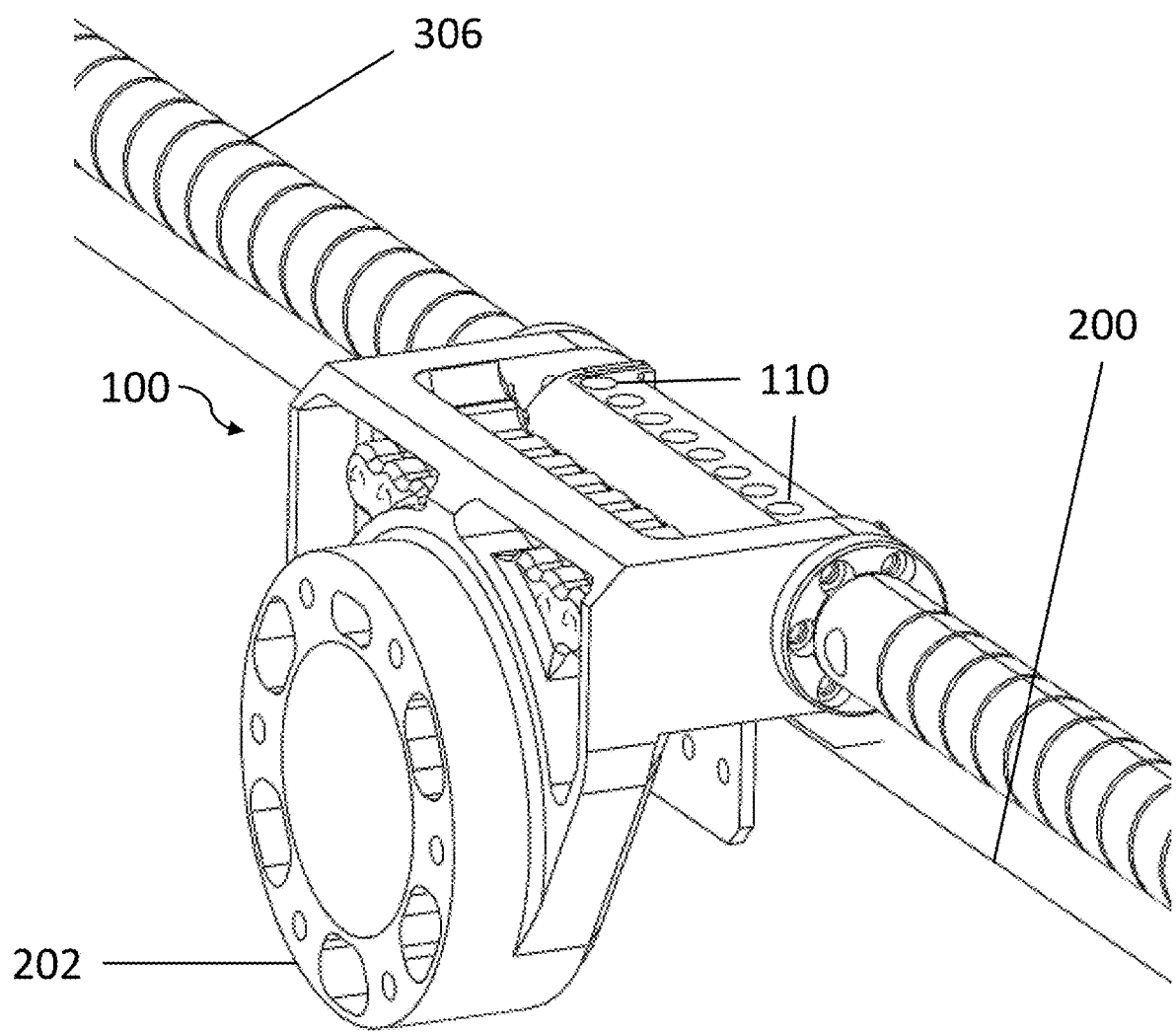
FIG. 9 illustrates a perspective view of a hinge-lock for a slip ring according to one embodiment of the present invention.

FIG. 9 illustrates a perspective view of a slip ring 202 according to one embodiment of the present invention. FIG. 9 illustrates a slip-ring 202 in a stowed position. In one embodiment, the hinge-lock 100 is operable to connect a slip ring 202 to a panel and/or mounting cable 306. In one embodiment, the hinge-lock 100 includes a plurality of 110 cantilevered hinge bores 110 operable to receive a plurality of corresponding tapered pins, in order to lock the slip ring 202 into a deployed position, while maintaining the energy reducing and stiffness increasing functionality described herein. In one embodiment, the slip ring 202 is connected to a base 204 operable to slide along a cable 306 running along the side of a panel 200. In one embodiment, the base 204 includes a locking mechanism operable to hold the position of the slip ring 202 in place along the cable 306.

Figure 10:
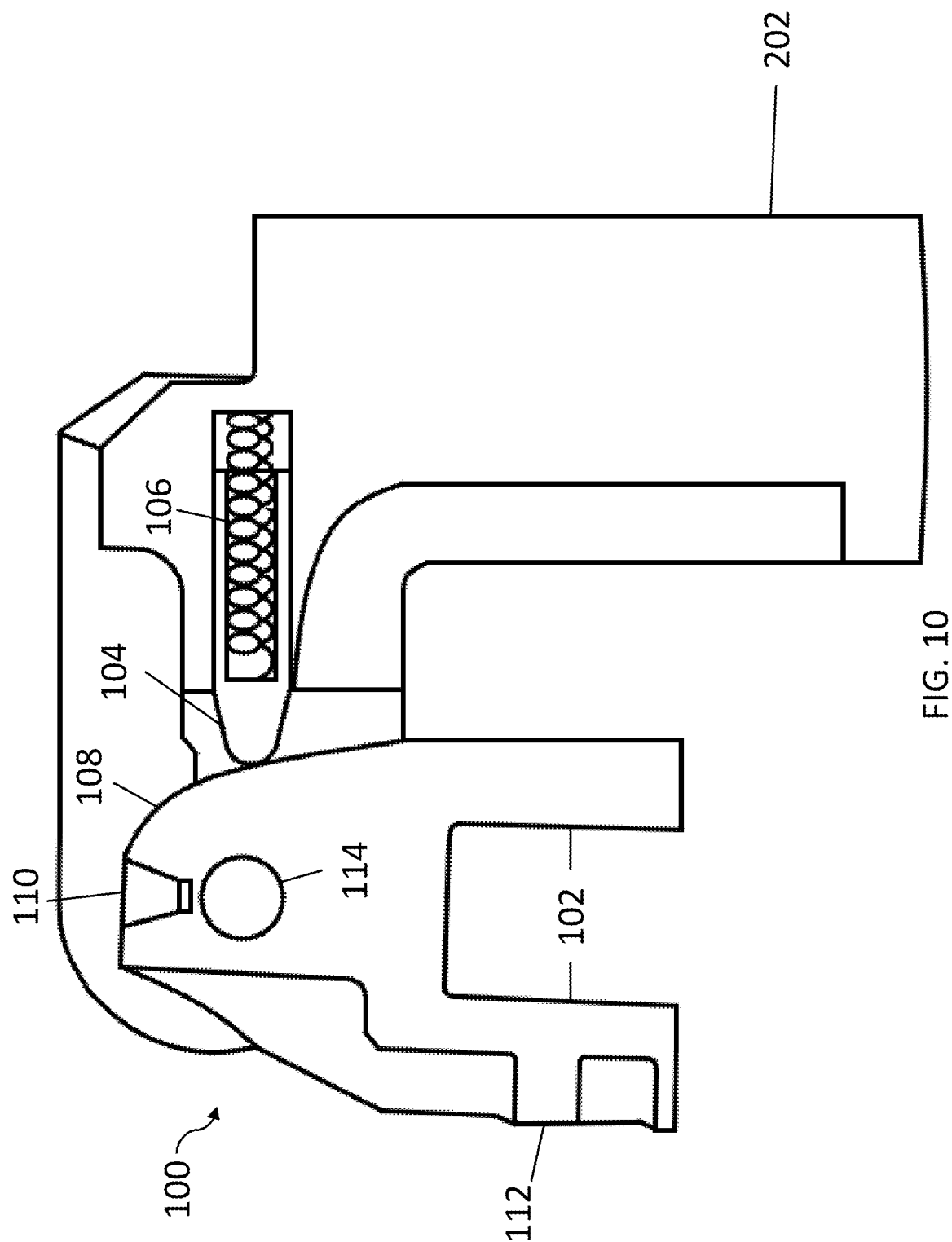
FIG. 10 illustrates a cross-sectional view of a hinge-lock for a slip ring according to one embodiment of the present invention.

FIG. 10 illustrates a cross-sectional view of a hinge-lock 100 for a slip ring 202 according to one embodiment of the present invention. In one embodiment, the hinge-lock 100 is operable to attach a slip ring 202 to a panel and/or a mounting cable. In the embodiment where the slip ring 202 is attached to a mounting cable, the female ear 102 is replaced with a circular receiving hole. In one embodiment, the hinge-lock 100 includes at least one female ear 102, at least one tapered pin 104, at least one spring 106, a common pivot point 108 and/or cam, a cantilevered hinge bore 110, at least one counter bore 112, and a hinge pin receiving hole 114. In this embodiment, the hinge-lock is in a stowed position when the slip ring 202 is at a 90-degree angle relative to the female component of the hinge-lock 100. In this embodiment, the hinge-lock 100 is in a deployed position when the slip ring 202 is at a 180-degree angle relative to the female component of the hinge-lock 100. However, the common pivot point 108 maintains the same rounded contour operable to increasingly compress the spring 106 of the tapered pin 104 as the hinge-lock 100 deploys. In this embodiment, the spring 106 is at its highest compression point right before the tapered pin 104 enters the cantilevered hinge bore 110. Advantageously, by modifying the hinge-lock 100 to accompany a slip ring, the entire solar array is attached to a body of an artificial satellite through the hinge-lock 100 of the present invention. Further advantageously, by including a hinge-lock to facilitate slip ring attachment, deployment of the solar array does not require a motor, reduces deployment impact of the panels, and increases deployment stiffness. One of ordinary skill in the art will appreciate the adaptability of the present invention and understand that the velocity-reducing function of the plurality of tapered pins, conical cam surface of the common pivot point, and corresponding cantilevered hinge bores are applicable to a wide variety of hinge devices and should not be limited to the specific examples described here.

Figure 11A:
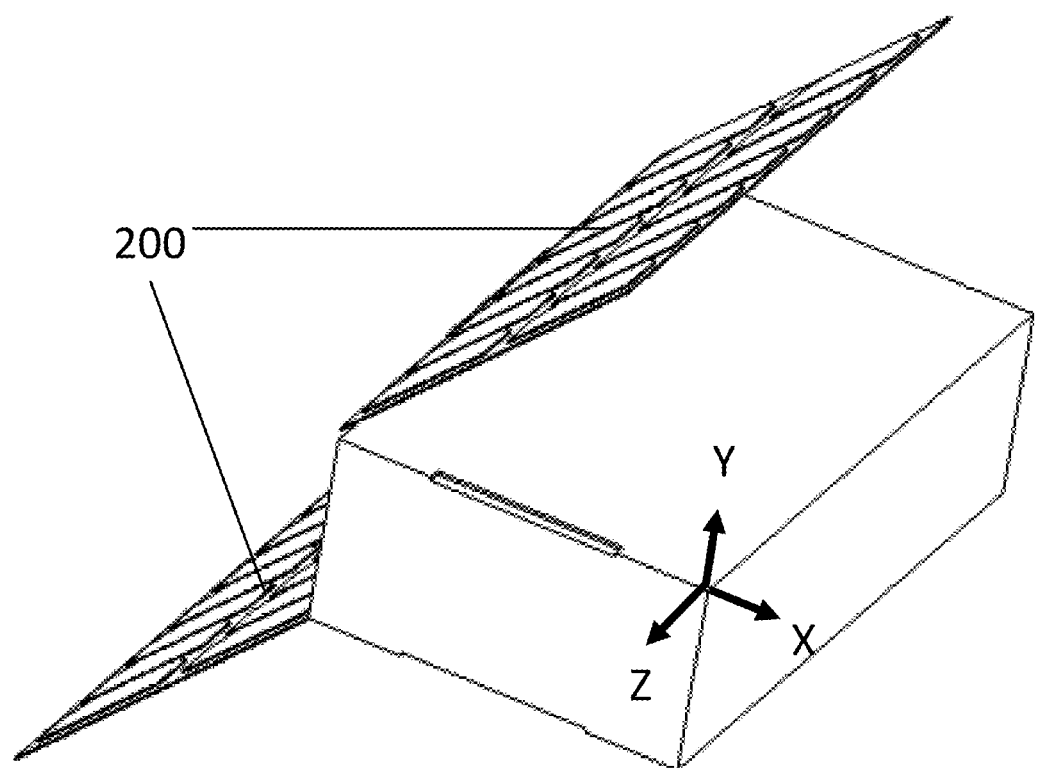
FIG. 11A illustrates a side perspective view of an artificial satellite with a deployed solar panel array according to one embodiment of the present invention.

FIG. 11A illustrates an artificial satellite with solar panels 200 deployed. According to one embodiment, the artificial satellite is substantially shaped like a rectangular prism. In another embodiment, the artificial satellite is not a rectangular prism. In one embodiment, the angle at which the solar panels 200 are deployed are different from one another. In another embodiment, the angle at which the solar panels 200 are deployed are the same. FIG. 11A is just a single embodiment and not intended to limit the number of solar panels. The artificial satellite is operable to include any number of solar panels.

Figure 11B:
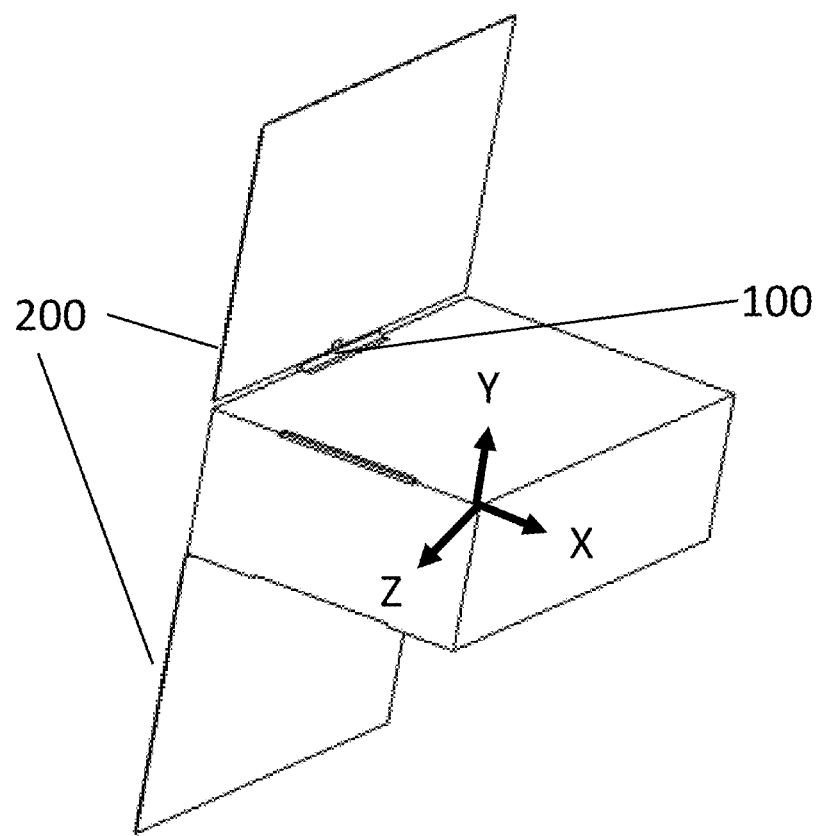
FIG. 11B illustrates a bottom perspective view of an artificial satellite with a deployed solar panel array according to one embodiment of the present invention.

FIG. 11B illustrates an artificial satellite with hinge-lock 100 in the deployed position for solar panels 200. In one embodiment, the artificial satellite comprises one hinge-lock. In another embodiment, the artificial satellite comprises two hinge-locks. In yet another embodiment, the artificial satellite comprises more than two hinge-locks.

Figure 11C:
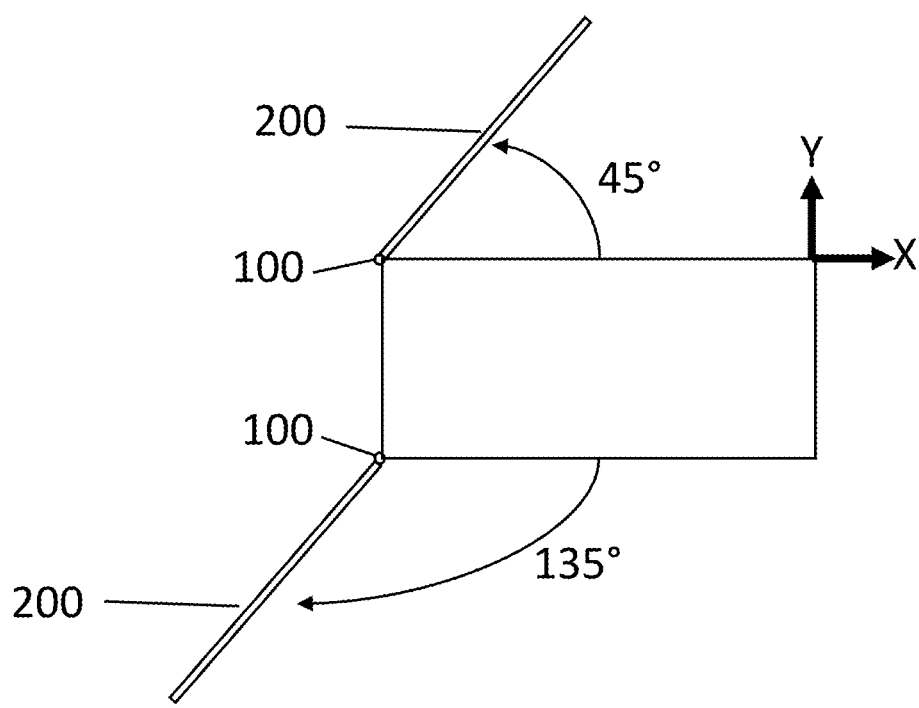
FIG. 11C illustrates an orthogonal view of an artificial satellite with a deployed solar panel array according to one embodiment of the present invention.

FIG. 11C illustrates an artificial satellite with hinge-locks 100 in the deployed position for solar panels 200 at different angles. In the non-limiting embodiment shown in FIG. 11C, one solar panel 200 is deployed at an angle of about 45 degrees relative to the artificial satellite and another solar panel 200 is deployed at an angle of about 135 degrees relative to the artificial satellite. In one embodiment, the hinge-lock is operable to deploy the solar panels 200 at any angle between 0 and 180 degrees.

Figure 12:
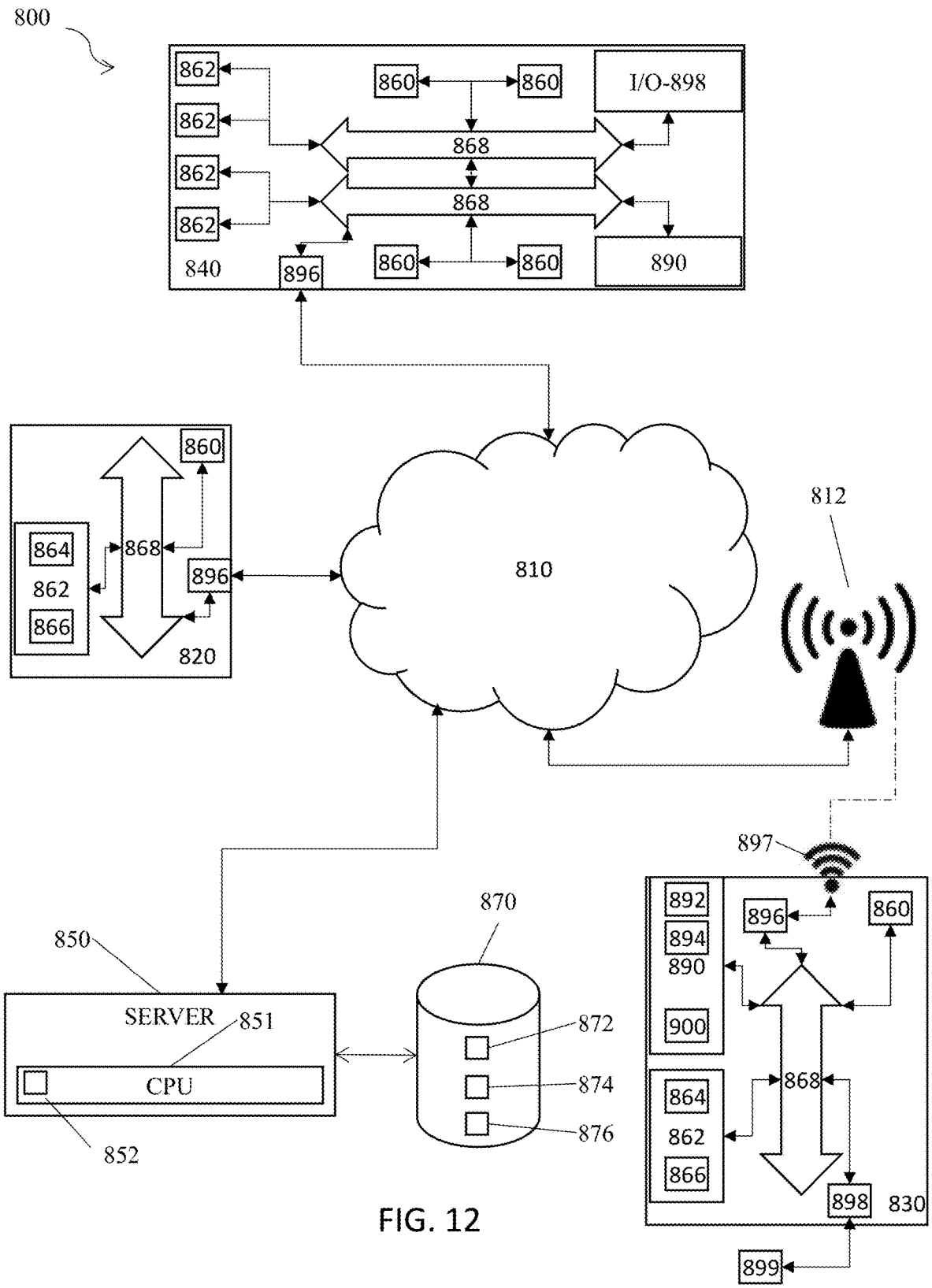
FIG. 12 is a schematic diagram of a system of the present invention.

FIG. 12 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 11, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 12, is operable to include other components that are not explicitly shown in FIG. 12, or is operable to utilize an architecture completely different than that shown in FIG. 12. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The present invention is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The present invention is operable to use any of the aforementioned learning techniques alone or in combination.

Further, the present invention is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The present invention is preferably operable to recommend and/or perform actions based on historical data, external data sources, ML, AI, NNs, and/or other learning techniques. The present invention is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:
1. A satellite solar panel system, comprising:
   at least one solar panel;
   at least one hinge-lock; and
   a passive release beam;
   wherein the at least one hinge-lock includes at least one female ear component connected to a central pivot point and at least one tapered pin;
   wherein the central pivot point includes at least one bore operable to receive the at least one tapered pin;
   wherein the at least one female ear component is connected to the at least one solar panel;
   wherein the passive release beam is connected to the at least one solar panel;
   wherein the passive release beam is operable to deploy the at least one solar panel;
   wherein the at least one female ear component and the at least one tapered pin are operable to rotate with respect to an axis of rotation of the central pivot point; and wherein the at least one tapered pin is operable to move in a substantially linear path perpendicular to the axis of rotation of the central pivot point to penetrate the at least one bore of the central pivot point upon the deployment of the at least one solar panel.

2. The satellite solar panel system of claim 1, wherein a hold-down bracket restricts movement of the passive release beam until the hold-down bracket is released.

3. The satellite solar panel system of claim 1, wherein the at least one hinge-lock includes a second female ear component connected to the central pivot point and the at least one tapered pin, wherein the second female ear component is connected to a second solar panel, and wherein the passive release beam is operable to deploy the second solar panel.

4. The satellite solar panel system of claim 1, wherein the at least one female ear component is connected to a hardpoint of the at least one solar panel.

5. The satellite solar panel system of claim 1, wherein the at least one bore of the central pivot point is operable to receive the at least one tapered pin such that deployment of the at least one solar panel is at an angle between of about 135 to 180 degrees with respect to at least one second solar panel.

6. The satellite solar panel system of claim 1, wherein the passive release beam comprises preloaded torsional strain such that the deployment of the at least one solar panel occurs without a motor.

7. The satellite solar panel system of claim 1, wherein the tapered pin comprises an internal tension bearing spring operable to release tension upon the deployment of the at least one solar panel.

8. A satellite solar panel system, comprising:
   at least one solar panel;
   at least one hinge-lock;
   a passive release beam; and
   at least one hold-down bracket connected to the at least one solar panel;
   wherein the at least one hinge-lock includes at least one female ear component connected to a central pivot point and at least one tapered pin;
   wherein the central pivot point includes at least one bore operable to receive the at least one tapered pin;
   wherein the at least one female ear component is connected to the at least one solar panel;
   wherein the passive release beam is connected to the at least one solar panel;
   wherein the at least one hold-down bracket restricts movement of the passive release beam until the at least one hold-down bracket is released;
   wherein the passive release beam is operable to deploy the at least one solar panel upon release of the at least one hold-down bracket;
   wherein the at least one female ear component and the at least one tapered pin are operable to rotate with respect to an axis of rotation of the central pivot point; and
   wherein the at least one tapered pin is operable to move in a substantially linear path perpendicular to the axis of rotation of the central pivot point to penetrate the at least one bore of the central pivot point upon the deployment of the at least one solar panel.

9. The satellite solar panel system of claim 8, wherein the at least one female ear component is connected to a hardpoint of the at least one solar panel.

10. The satellite solar panel system of claim 8, wherein the at least one hinge-lock includes a second female ear component connected to the central pivot point and the at least one tapered pin, wherein the second female ear component is connected to a second solar panel, and wherein the passive release beam is operable to deploy the second solar panel.

11. The satellite solar panel system of claim 8, wherein the at least one bore of the central pivot point is operable to receive the at least one tapered pin such that the deployment of the at least one solar panel is at an angle of about 180 degrees with respect to at least one second solar panel.

12. The satellite solar panel system of claim 8, wherein the at least one hold-down bracket detaches from the at least one solar panel upon the deployment of the at least one solar panel.

13. The satellite solar panel system of claim 8, wherein the tapered pin comprises an internal tension bearing spring operable to release tension upon the deployment of the at least one solar panel.

14. A satellite solar panel system, comprising:
   at least one solar panel;
   at least one hinge-lock;
   a passive release beam; and
   at least one hold-down bracket;
   wherein the at least one hinge-lock includes at least one female ear component connected to a central pivot point and at least one tapered pin;
   wherein the central pivot point includes at least one bore operable to receive the at least one tapered pin;
   wherein the at least one female ear component is connected to the at least one solar panel;
   wherein the passive release beam is connected to the at least one solar panel;
   wherein the at least one hold-down bracket restricts movement of the passive release beam until the at least one hold-down bracket is released;
   wherein the passive release beam is operable to deploy the at least one solar panel upon release of the at least one hold-down bracket without a motor;
   wherein the at least one female ear component and the at least one tapered pin are operable to rotate with respect to an axis of rotation of the central pivot point; and
   wherein the at least one tapered pin is operable to move in a substantially linear path perpendicular to the axis of rotation of the central pivot point to penetrate the at least one bore of the central pivot point upon the deployment of the at least one solar panel.

15. The satellite solar panel system of claim 14, wherein the at least one female ear component is connected to a hardpoint of the at least one solar panel.

16. The satellite solar panel system of claim 14, wherein the at least one bore of the central pivot point is operable to receive the at least one tapered pin such that the deployment of the at least one solar panel is at an angle of about 180 degrees with respect to at least one second solar panel.

17. The satellite solar panel system of claim 14, wherein the at least one hinge-lock includes a second female ear component connected to the central pivot point and the at least one tapered pin, wherein the second female ear component is connected to a second solar panel, and wherein the passive release beam is operable to deploy the second solar panel.

* * * * *